(12) United States Patent
Chian

(10) Patent No.: US 7,073,524 B2
(45) Date of Patent: Jul. 11, 2006

(54) FAIL SAFE DRIVE FOR CONTROL OF MULTIPLE SOLENOID COILS

(75) Inventor: Brent Chian, Plymouth, MN (US)

(73) Assignee: Honeywell International Inc., Morristown, NJ (US)

(*) Notice: Subject to any disclaimer, the term of this patent is extended or adjusted under 35 U.S.C. 154(b) by 355 days.

(21) Appl. No.: 10/751,222

(22) Filed: Jan. 2, 2004

(65) Prior Publication Data
US 2005/0145282 A1   Jul. 7, 2005

(51) Int. Cl.
*F16K 31/06* (2006.01)

(52) U.S. Cl. ............... 137/1; 137/613; 251/129.01; 361/152; 361/160

(58) Field of Classification Search ......... 137/613, 137/1; 251/129.01; 361/152, 160
See application file for complete search history.

(56) References Cited

U.S. PATENT DOCUMENTS

| | | | |
|---|---|---|---|
| 4,238,185 A | 12/1980 | Watson | |
| 4,607,787 A | 8/1986 | Rogers, III | |
| 4,865,538 A | 9/1989 | Scheele et al. | |
| 5,085,574 A | 2/1992 | Wilson | |
| 5,289,811 A * | 3/1994 | Covert et al. | 251/129.05 |
| 5,520,533 A | 5/1996 | Vrolijk | |
| 5,590,642 A | 1/1997 | Borgeson et al. | |
| 5,917,691 A | 6/1999 | Kadah | |
| 6,005,763 A * | 12/1999 | North | 361/154 |
| 6,050,281 A | 4/2000 | Adams et al. | |
| 6,371,573 B1 * | 4/2002 | Goebels et al. | 303/113.1 |

FOREIGN PATENT DOCUMENTS

GB    1 597 220    9/1981

* cited by examiner

*Primary Examiner*—Kevin Lee
(74) *Attorney, Agent, or Firm*—Gregory M. Ansems

(57) ABSTRACT

A fail-safe apparatus for controlling fluid flow through a series arrangement of first and second solenoid-controlled valves is provided. The fail-safe apparatus includes fail-safe circuitry for controlling the operation of the first and second solenoid-controlled valves between unactuated and actuated states. Based on a given duty cycle, the fail-safe circuitry selects, actuates, deactuates, and/or maintains in the actuated or unactuated state one or both of the first and second solenoid-controlled valves.

To facilitate such control, the fail-safe circuitry may include a switch operable to couple an input voltage across the first solenoid-controlled valve to cause a first current to flow therein. The fail-safe circuitry may also include an energy-transfer device coupled between the first and second solenoid-controlled valves. Depending of the duty cycle, the energy-transfer device is operable to store a potential therein and/or use the stored potential to assist in controlling the first and second solenoid-controlled valves.

68 Claims, 13 Drawing Sheets

FAIL SAFE DRIVE FOR CONTROL OF MULTIPLE SOLENOID COILS

FIELD

The present invention relates generally to a fail-safe circuit, and more particularly, relates to fail-safe circuitry for independently controlling multiple solenoid coils. The invention is particularly useful in controlling solenoid-controlled pneumatic valves in combustible fuel-fired apparatuses.

BACKGROUND

Water heaters, furnaces, boilers, fireplaces, and other combustible fuel-fired equipment or appliances generally include valving systems to connect and control the flow of gas between an external supply and their respective burners. These valving systems typically include normally closed, solenoid-controlled pneumatic valves so that the external supply of gas, which may be delivered to the valving systems via pipes connected to a gas supplier, a locally situated tank and/or other delivery system, only flows when called for. In other words, gas does not flow unfettered in normal operation.

Without such valving systems, not only would freely venting the gas supply be an extreme waste of a resource, but also, when vented in a closed or semi-closed environment, the gas volume in the locale of the gas-fired equipment might build. The build up of gas may create a potentially dangerous situation. For example, an explosion could result with a given amount of gas build-up and an ignition source. Over time, fairly sophisticated valving and valve-control systems have been developed to safely supply gas to the gas-fired equipment. Such systems, for example, may include direct-ignition combustion systems.

To limit inadvertent gas flow, some direct-ignition combustion systems employ a series of redundantly plumbed solenoid-controlled pneumatic valves. For gas to flow, all of the valves need to be open. Generally, to control the opening and closing of the solenoid valves, direct-ignition combustion systems typically employ electronic drive mechanisms, which have a plurality of electronic components. In operation, these electronic drive mechanisms energize and de-energize the solenoid coil of the solenoid-controlled pneumatic valves, which in turn causes the mechanical portion of the valves to open and close. And when all valves are mechanically open, gas flows.

Unfortunately, however, the electronic drive mechanisms and the electronic components can fail. When one or more components of these mechanisms fail, valves can be left open and cause gas to flow, which can cause an unsafe condition. To prevent this from happening, fail-safe electronic drives are employed. These fail-safe drives can prevent inadvertent flow through the redundantly plumbed valves when critical components in the drive systems fail. When the components of these systems fail, it would be desirable to determine which of the drive components have failed.

In typical fail-safe systems, two solenoid-controlled pneumatic valves are used. In these systems, the fail-safe mechanisms (i) control only one valve (and the other valve is controlled by another mechanism), (ii) employ separate mechanisms to control each of two valves, or (iii) use energy transferred from control of one valve to control the second valve (i.e., the first valve must be on for the second valve to turn on). As such, the fail-safe systems either lack the ability to independently control each of the valves single handedly or require a plurality of fail-safe circuits to independently control each of the valves.

Thus, it would be desirable to have a single, low-cost, fail-safe mechanism (e.g., fail safe circuitry) to (i) independently control each of the valves during normal operation, (ii) independently control each valve during testing, and (iii) diagnose and isolate faulty circuitry when one or more of the fail-safe mechanism and/or components thereof fails.

BRIEF DESCRIPTION OF THE DRAWINGS

Exemplary embodiments are described below in conjunction with the appended drawing Figures, wherein like reference numerals refer to like elements in the various Figures, and wherein.

DETAILED DESCRIPTION OF PRESENTLY PREFERRED EMBODIMENTS

In the following detailed description, numerous specific details are set forth in order to provide a thorough understanding of the invention. However, it will be understood that the present invention may be practiced without these specific details. In other instances, well-known methods, procedures, components and circuits have not been described in detail, so as not to obscure the present invention. Further, the presently preferred embodiments disclosed are for exemplary purposes only and other embodiments may be employed in lieu of or in combination with the embodiments disclosed.

1. Overview

Figure 1:
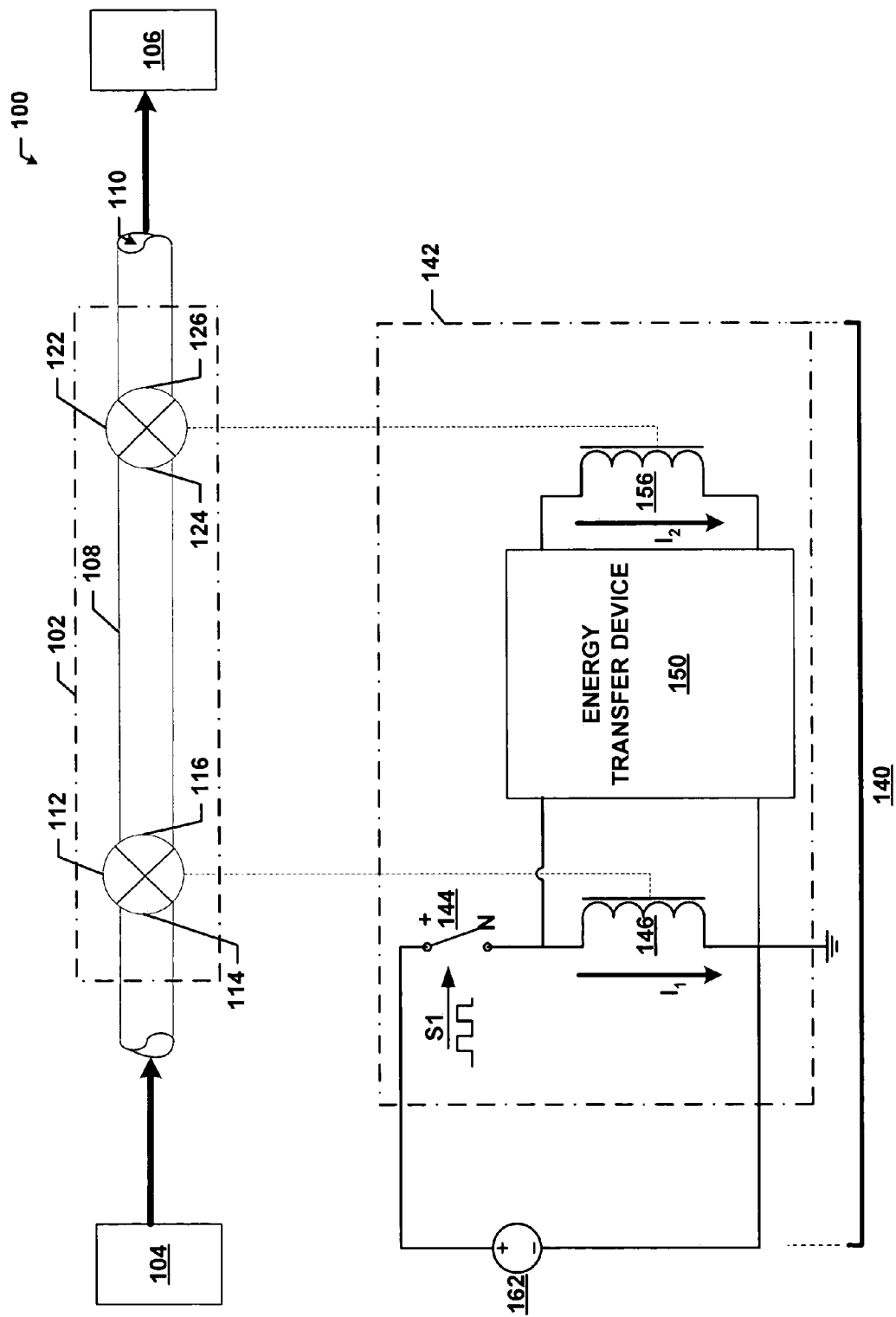
FIG. 1 is a first block diagram illustrating an exemplary combustible-fuel-delivery system having a valving system and a fail-safe drive system in accordance with an exemplary embodiment.

FIG. 1 illustrates a combustible-fuel-delivery system 100 according to an exemplary embodiment. The combustible-fuel-delivery system 100 may include a valving system 102 and a fail-safe-drive system 140. The fail-safe-drive system 140 is capable of, but not limited to, (i) controlling the valving system 102 under normal operating conditions, (ii) performing fail-safe shutdown when the fail-safe-drive system 140 fails, and/or (iii) diagnosing failures of the combustible-fuel-delivery system 100 when failures occur.

The valving system 102 may pneumatically couple an upstream supply 104 of combustible fuel to a downstream, combustible-fuel-fired apparatus 106. Included in the vavling system is a pipe or manifold 108 having an internal passageway 110 through which combustible fuel may flow.

The downstream flow of combustible fuel may pass through passageway 110 via a series arrangement of first and second solenoid-controlled valves 112, 122 (hereinafter referred to as "first and second valves"). The first and second valves 112, 122 have respective inlet ports 114, 124 for receiving the combustible fuel, and respective outlet ports 116, 126 for supplying the combustible fuel.

As shown, the first valve 112 is located upstream from the second valve 122. When both of the first and second valves 112, 122 are opened, the downstream flow of combustible fuel from the upstream supply 104 may pass to the combustible-fuel-fired apparatus 106. Given the redundancy and the corresponding safety of the serially-plumbed first and second valves 112, 122, if either is not open, then the combustible fuel will not flow to the combustible-fuel-fired apparatus 106.

While only two valves are shown, namely, the first and second valves 112, 122, more than two of such valves may be pneumatically plumbed in series for additional redundancy, which in theory adds additional safety. In such case, all the redundant valves must be "open" to allow the flow of combustible fuel from upstream supply 104 to the combustible fuel-fired apparatus 106.

The fail-safe-drive system 140 controls the operation of the first and the second valves 112, 122 by facilitating the opening or "actuating" and closing or "de-actuating" the respective first and second valves 112, 122. Operating the fail-safe-drive system 140 at a given duty cycle or within a range of duty cycles allows for independent actuation and/or de-actuation of the valves 112, 122. For instance, the first valve 112 may be actuated when operating the fail-safe drive system 140 at a first duty cycle, the second valve 122 may be actuated when operating the fail-safe-drive system 140 at a second duty cycle, and both the first and second valves 112, 122 may be actuated at a third duty cycle.

The architecture of the fail-safe-drive system 140 may include a fail-safe circuit 142 that can be coupled to an input power supply 162. The fail-safe circuit 142 may be constructed from a switch 144, first and second solenoid coils 146, 156, and an energy-transfer device 150 that is coupled between the first and second solenoid coils 146, 156.

The first and second solenoid coils 146, 156 may control the operation of the first and second valves, respectively, between unactuated and actuated states. To initially actuate or in the parlance of solenoid-controlled valves, "pull-in," the first and/or second valve 112, 122, the valve's respective load (i.e., first solenoid coil 146 and the second solenoid coil 156) must experience a threshold "pull-in current" to actuate from an unactuated state. This pull-in current is generally greater than the amount of current that is required for maintaining the valve in an actuated state. Thus, after a valve is initially actuated, a smaller maintenance or "holding current" and its corresponding voltage are required to "hold-in" the valve in the actuated state.

For an unactuated or non-pulled-in valve, a current that is less than the pull-in current threshold can flow though the valve's load, but will not generate enough magnetic field to cause the valve to operate in an actuated state. Similarly, if, after operating in an actuated state, the current through the valve's load drops below the holding current threshold and thereby fails to generate enough magnetic field, the valve will de-actuate and operate in an unactuated state even though some amount of current may be still flowing through the valve's load.

When closed, the switch 144 can cause a first current to flow in the first solenoid coil 146 by coupling an input voltage across it. The amount of first current flowing depends on the duration of the closure time of the switch 144. The longer the duration, the greater the amount of current flows. With a long enough duration, the first current will build up to the point where the first solenoid coil 146 saturates.

When open, the switch 144 decouples the input voltage across the first solenoid coil 146. This allows any first current stored in the coil to decay or "freewheel." If the duration of the open time is short, the first current might not significantly decay. With a long enough duration, the first current may decay to zero. The decay of the first current, however, may be affected by energy stored in the energy-transfer device 150, as will be described in more detail below. Adjusting the duration of the open and/or close time of the switch 144 can determine whether the average amount of the current over the duty cycle is sufficient to pull-in, hold-in and/or release the valve 112.

Accordingly, the switch 144 may be operated at various switching-cycle rates that ultimately determine the duty cycle of the fail-safe-drive system 140. That is, each switching cycle defines successive "on" and "off" states. Each of the successive on and off states has a given duration. Shorter or longer durations of either the on or off states can change the proportion of conducting time of the switch 144 over a given cycle, which in turn define a duty cycle. By varying the switching cycle rates, the duty cycle can be correspondingly changed.

Thus, during the on state of any duty cycle, the switch 144 can cause the first current to flow by coupling the input voltage across the first solenoid coil 146. If the first current meets or exceeds the pull-in current threshold, then the first valve 112 will actuate. If the first valve 112 is already actuated and the first current meets or exceeds the hold-in current threshold, then the first valve 112 may be maintained in the actuated state.

When the first current falls below the hold-in current threshold, the first valve 112 will de-actuate. If, however, the first valve 112 is not already actuated and the first current fails to meet the pull-in current threshold, then the first valve will fail to actuate.

At certain duty cycles, a potential may be established in the energy-transfer device 150. This potential can change in polarity, and when used in combination with the input voltage, it may cause a second current to flow in the second solenoid coil 156. If the second current meets or exceeds the pull-in current threshold, which may or may not be the same amount as for the first valve, the second valve 122 will actuate.

If the second valve 122 is already actuated, this combination may help maintain the second current above the hold-in current threshold. If not already actuated, the second valve 122 might not actuate when the second current fails to meet the pull-in current threshold. Similarly, when the second current fails to stay above the hold-in current threshold, the second valve 122 will de-actuate. The pull-in and hold-in current thresholds for the second solenoid coil 156 may or may not be the same as that for the first solenoid coil 146. For convenience, however, these thresholds will be generically referred to hereinafter the as "pull-in threshold" and "hold-in threshold" for both the first and second solenoid coils 146, 156.

During the off state of any of the duty cycles, the potential established in the energy-transfer device 150 may affect the decay rate of the first and second currents flowing through their respective first and second solenoid coils 146, 156. Depending on the amount of energy and the polarity of the potential established in the energy-transfer device 150, the rate of decay of the first and/or second currents can be varied. The amount of energy and the potential established in the energy-transfer device 150 depends upon which duty cycle or range of duty cycles that the fail-safe-drive system 140 is operating at.

The following describes exemplary operation of the fail-safe-drive system 140 at (A) a high duty cycle, during which only the first valve 112 is actuated; (B) a low duty cycle, during which only the second valve 122 is actuated, and (C) a mid-range duty cycle, during which both the first and second valves 112, 122 are actuated. The fail-safe drive system 140 may be operated at other duty cycles, such as a very low duty cycle, during which neither of first and second valves 112, 122 are actuated. The high duty cycle may have an on-state duration of approximately 70 to 100 percent of a given switching cycle. The low duty cycle defines an on-state duration of approximately 10 to 30 percent of a given switching cycle. The mid-range duty cycle defines an on-state duration of approximately 50 percent of a given switching cycle.

A. High Duty Cycle

During the on-state of one or more switching cycles at the high duty cycle, the switch 144 couples the input voltage supplied from the input power supply 162 across the first solenoid coil 146 so as to cause the first current to meet or exceed the pull-in current threshold. This causes the first valve 112 to operate in the actuated state.

During the off state, a potential established in the energy-transfer 140 helps to maintain the first current above the hold-in threshold. When the first current is above the hold-in threshold, the first valve 112 can be sustained in the actuated state. Once actuated, subsequent on states cause the first valve 112 to stay actuated. Thus, after the initial pull-in, the average of the first current is maintained above at least the hold-in threshold.

In addition to having a magnitude of about the input voltage, the potential established in the energy-transfer device 150 has a positive polarity from between the first solenoid coil 146 to the second solenoid coil 156. After the switch decouples the input voltage, the first current freewheels from the first solenoid coil 146. But instead of decaying freely, its rate of decay is slowed by the potential established in the energy-transfer device 150. As a consequence, the first current that freewheels from the first solenoid coil 146 causes at least a portion of the energy stored in the energy-transfer device 150 to deplete.

After the switch 144 re-couples the input voltage across the first solenoid coil, however, the input voltage replenishes the depleted portion of the energy stored in the energy-transfer device. Because of the short duration of the off state at the high duty cycle, the switch 144 re-couples the input voltage before the first current can drop below the hold-in current, thereby causing the first current to be maintained over hold-in threshold.

Moreover, the potential established in the energy-transfer device 150 limits the second current flow so as to cause it to be below the pull-in threshold during both the on and off states. Thus, during the on-state of the switch 144, the application of the input voltage causes energy-transfer device 150 to store energy and establish the potential having the polarity noted above. At this potential, the energy-transfer device 150 causes a little or no second current to flow, thereby causing the second valve 122 to operate in an unactuated state.

During the off state, the magnitude of the established potential drops as a result of the first current depleting a portion of the energy stored in the energy-transfer device 150. Given the short duration of the off state, any second current resulting from this potential does not rise to the level of the pull-in current threshold. Consequently, the second valve 122 operates in the unactuated state.

B. Low Duty Cycle

When the switch 144 is operating in the on state at the low duty cycle, it couples the input voltage across the first solenoid coil 146 as before. But because the duration of the on state is short, the first current fails to rise above the hold-in and pull-in thresholds, which causes the first valve 122 to operate in the unactuated state.

On the other hand, the combination of the input voltage and the potential established in the energy-transfer device 150, which has a positive polarity from between the second solenoid coil to the first solenoid coil, causes the second current to exceed the pull-in threshold. This in turn causes the second valve 122 to operate in the actuated state.

During the off state, any residual current in the first solenoid coil 146 decays in magnitude, and thus, does not rise above the pull-in threshold. This in turn causes the first valve 112 to operate in the unactuated state. And because of the polarity of the potential established in the energy-transfer device 150, the residual first current rapidly decays. As part of its decay, the first current freewheels from the first solenoid coil 146 boosting the potential established in the energy-transfer device 150. This boost may assist in causing the second current to exceed the pull-in threshold during the on state.

In addition to affecting the decay of the first current, the energy-transfer device 150 also provides a freewheeling path for the second current. This freewheeling path may assist in limiting the decay rate of the second current so that the average of the second current can be maintained above the pull-in threshold and the second valve 122 in the actuated state. After the switch re-couples the input voltage across the first solenoid coil 146, the potential established in the energy-transfer device 156 helps to boost the level of the second current, and then the cycle starts anew.

C. Mid-Range Duty Cycle

As noted, the mid-range duty cycle has an on or off state duration of approximately 50 percent of the given switching cycle. Over entire switching cycle, little or substantially no net potential is established in the energy-transfer device 150. When the switch 144 couples the input voltage across the first solenoid coil 146 during the on state, it causes the first current to exceed the pull-in threshold, which in turn causes the first valve 112 to operate in the actuated state.

During the same period, any transient potential established in the energy-transfer device 150 in combination with the input voltage causes the second current to exceed the pull-in current theshold. This causes the second valve 122 to operate in the actuated state. During the off state, the energy-transfer device 150 provides freewheeling paths for the first and second currents. These freewheeling paths in combination with the lack of any substantial potential established in energy-transfer device 150 assist controlling the rate of decay of the freewheeling currents so as to maintain the first and second currents above their respective hold-in currents. As such, the first and second valves 112, 122 are maintained in the actuated state.

2. Exemplary Architecture

Figure 2:
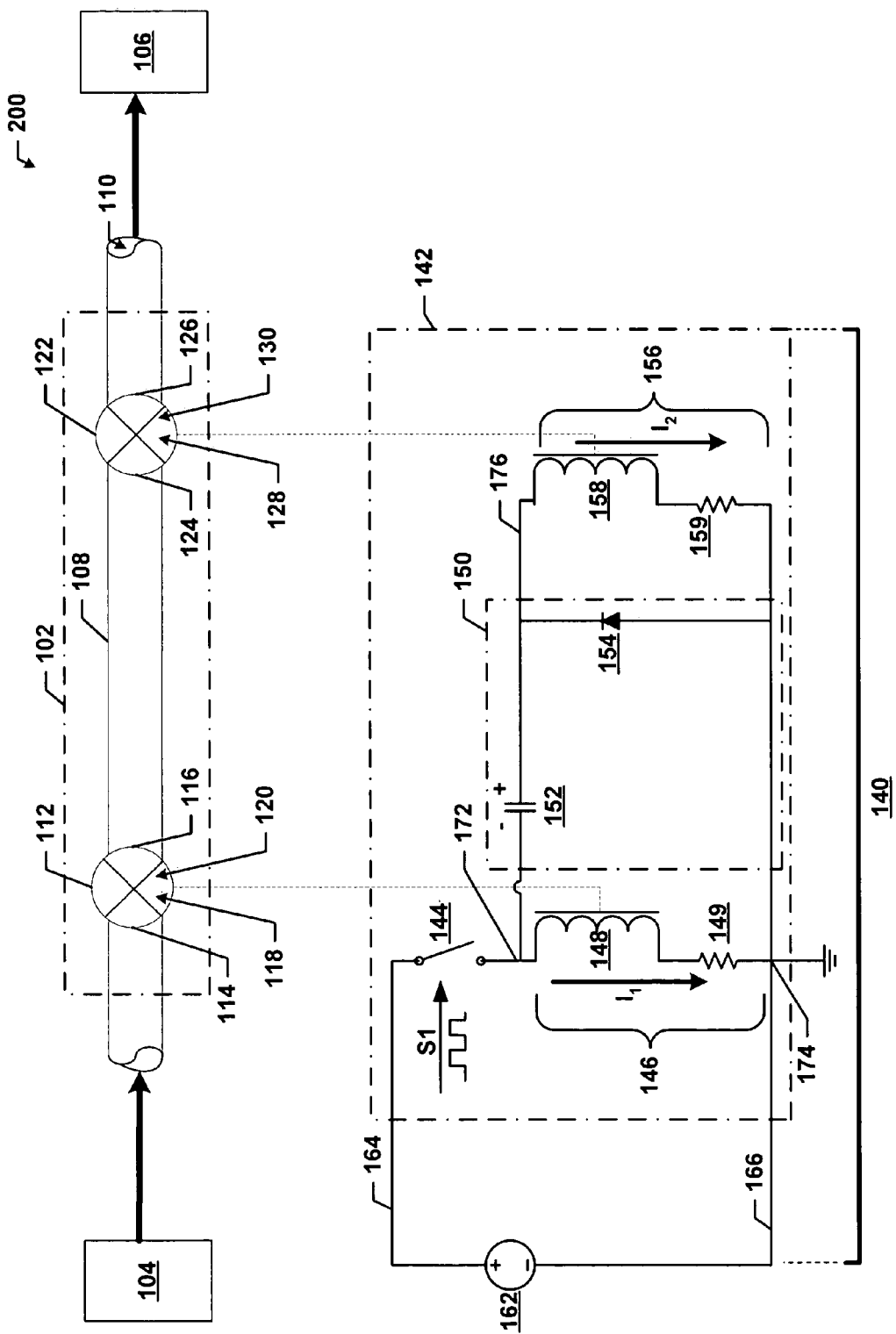
FIG. 2 is a second block diagram illustrating a second exemplary combustible-fuel-delivery system having a valving system and a fail-safe drive system in accordance with an exemplary embodiment.

FIG. 2 illustrates the combustible-fuel-delivery system 200 according to another exemplary embodiment. The combustible-fuel-delivery system 200 is similar to the combustible-fuel-delivery system 100 illustrated in FIG. 1, except as described herein. With reference to FIG. 2, high-side and low-side supply conductors 164, 166 collectively couple the input power supply 162 to the fail-safe circuit 142. In this exemplary embodiment, the energy-transfer device 150 may be embodied as a capacitor 152 and rectifier 154.

The input power supply 162 is operable to source an input electrical signal having a positive voltage $V_{in}$ and a corresponding input current from between the high-side supply conductors 164 and the low-side supply conductor 166. For example, the input power supply 162 can be configured to supply enough current at a nominal voltage of 5 volts DC so as to maintain the high-side supply conductor 164 at a system reference potential or nominal voltage and the low-side supply conductor 166 at a low-side reference potential and/or earth ground. The voltage $V_{in}$, however, may be significantly greater, e.g., 20 times greater, than a valve's specified pull-in voltage. The fail-safe circuit 142 may use the input electrical signal for controlling the actuation of the first and second solenoid-controlled valves 112, 122.

The input power supply 162 may be deployed as a transformer and rectifier bridge combination, and/or other voltage rectification and regulation components as known in power source regulation. Alternatively, instead of being sourced by traditional power source regulation components, an input electrical signal may be supplied by a thermopile, and/or other analog or digital source (not shown). The input power supply 162 may also include various additional switches and circuits for achieving desired safety, timing, and sequencing functions.

When closed, the switch 144 couples the input electrical signal so as to cause sourced current to flow into a first common node 172. Depending on the duty cycle, the sourced current can flow into the first solenoid coil 146 and/or the capacitor 152.

The switch 144 may be constructed from mechanical or electromagnetic-relay-controlled elements, solid-state or semiconductor-based elements, and/or any other switching elements that allow for a variable duty ratio. Accordingly, the construction of the switch 144 may be discrete, monolithic and/or hybrid. Thus, the architecture of the switch 144 may include one or more metal oxide semiconductor field effect transistors (MOSFETs), one or more junction field effect transistors (JFETs), one or more bipolar-junction transistors (BJTs), and/or any other monolithic, discrete or hybrid switches capable of switching at various frequencies and pass enough current.

Control signals, which can be illustratively represented by "$S_1$," control the duty cycle of the switch 144 (i.e., the fraction of time the switch is in a conducting state over a given switching cycle). These control signals $S_1$ are supplied by a control circuit (not shown), and may be implemented using a microprocessor. Alternatively, other signal generators, such as pulse-width-modulation signal generators, pulse-frequency-modulation signal generators, and/or feedback-controlled or hysteretic signal generators, may source the control signals S1. The control signals $S_1$ may be pulse-width modulated control signals, pulse-frequency-modulated control signals, hysteretic control signals, and/or other signals that may vary in magnitude, shape and frequency.

In the embodiment shown on FIG. 2, the first solenoid coil 146 is illustrated as its equivalent impedance, which may be modeled as a first inductor 148 and a first resistor 149. This equivalent impedance model is presented with simplicity so as not to obscure the details of the present embodiment. The actual impedance may be modeled differently and include other higher order components, such as back-emf inductors.

One end of the first solenoid coil 146 may be coupled to the switch 144 at the first common node 172. Its other end may be coupled to a common low-side or ground node 174, which, in turn, is coupled to the low-side conductor 166. This common low-side reference or ground node 174 may be earth ground or other low-side circuit reference potential and may be designed such that the common low-side reference or ground node 174 limits undesirable ground loop currents. For convenience, however, the common low-side reference or ground node 174 will be collectively referred to as "common low-side-node" 174.

The rectifier 154 couples to the capacitor 152 at a second common node 176 and to the common-low-side node 174 in a reverse bias orientation. This orientation allows forward bias current to flow from the common-low-side node 174 to the second common node 176.

The second solenoid coil 156 is coupled in parallel with the rectifier 154. Similar to the first solenoid coil 146, the second-solenoid coil 156 is illustrated as its equivalent impedance, which includes a second inductor 158 and a second resistor 159. Like the first solenoid coil 146, this equivalent impedance model is presented with simplicity so as not to obscure the details of the present embodiment.

The capacitor 152 may be a non-polarized type having a voltage rating that is at least as high as the value of input voltage $V_{in}$, and in some embodiments, approximately two times the value of $V_{in}$. In characterizing the capacitor 152, its energy storing capacity may be configured to provide a pull-in current for the second solenoid coil 156 at various given operating frequencies of switch 144.

The architecture of rectifier 154 may include (i) one or more diodes, such as Schottky diodes; (ii) one or more synchronous rectifiers, which may be constructed from one or more enhancement or depletion mode NMOS or PMOS transistors; and/or (iii) any other discrete, monolithic, and/or hybrid rectifier having the ability to switch from a conducting state to a non-conducting state.

The following table contains exemplary values for properties of each of the components of the fail-safe circuit 142.

TABLE 1

| Component | Properties |
| --- | --- |
| Switch 144 | $R_{DS}$-ON ≤ 0.2 |
| Capacitor 152 | 3 µF, 50 V |
| Rectifier 154 | IN5817 |
| First Solenoid Coil 146 | 250 mH |
| Second Solenoid Coil 156 | 250 mH |
| Resistor 149 | 12 Ω |
| Resistor 159 | 12 Ω |

3. Exemplary Operation

The following is a general description of the operation of the combustible-fuel-delivery system 200. The combustible-fuel-delivery system 200 may be operated in at least three modes. The first of these modes is a "VALVE SELECT" mode in which the fail-safe-drive system 140 drives one or the other of the first and second valves 112, 122 to an actuated state, but prevents the combustible fuel from flowing from the upstream supply 104 to the combustible-fuel-fired apparatus 106.

The second mode is an "OFF" mode in which the fail-safe-drive system 140 does not drive either of the first and second valves 112, 122 to an actuated state, and thereby prevents the combustible fuel from flowing from the upstream supply 104 to the combustible-fuel-fired apparatus 106. The third mode is an "OPERATIONAL" mode in which the fail-safe-drive system 140 drives both of the first and second valves 112, 122 to an actuated state, which allows the combustible fuel to flow from the upstream supply 104 to the combustible-fuel-fired apparatus 106.

Each of the FIGS. 3–6 illustrate a set of steady state curves that represent various voltages and currents of elements of the fail-safe circuit 142 for each of the above listed modes. These curves are shown in reference to the control signal $S_1$ that operates the switch 144 at various duty cycles. The polarities of these curves are illustrated for exemplary purposes only, and not intended to provide for inflexible circuit analysis. And given the numerous variations and possible combinations of solenoid coils, input electrical signals, and other components of fail-safe circuit 142, the actual value of the magnitudes of the curves are not shown.

A. Valve Select Mode

In the VALVE SELECT mode, one or the other of the valves are held in actuated state by the fail-safe drive system 140. This can occur when one or the other of the first or second solenoid coils 146, 156 experience a current sufficient to meet the pull-in threshold and thereafter experience a current sufficient to satisfy the hold-in threshold.

(1) Independent Operation of the First Valve

Figure 3:
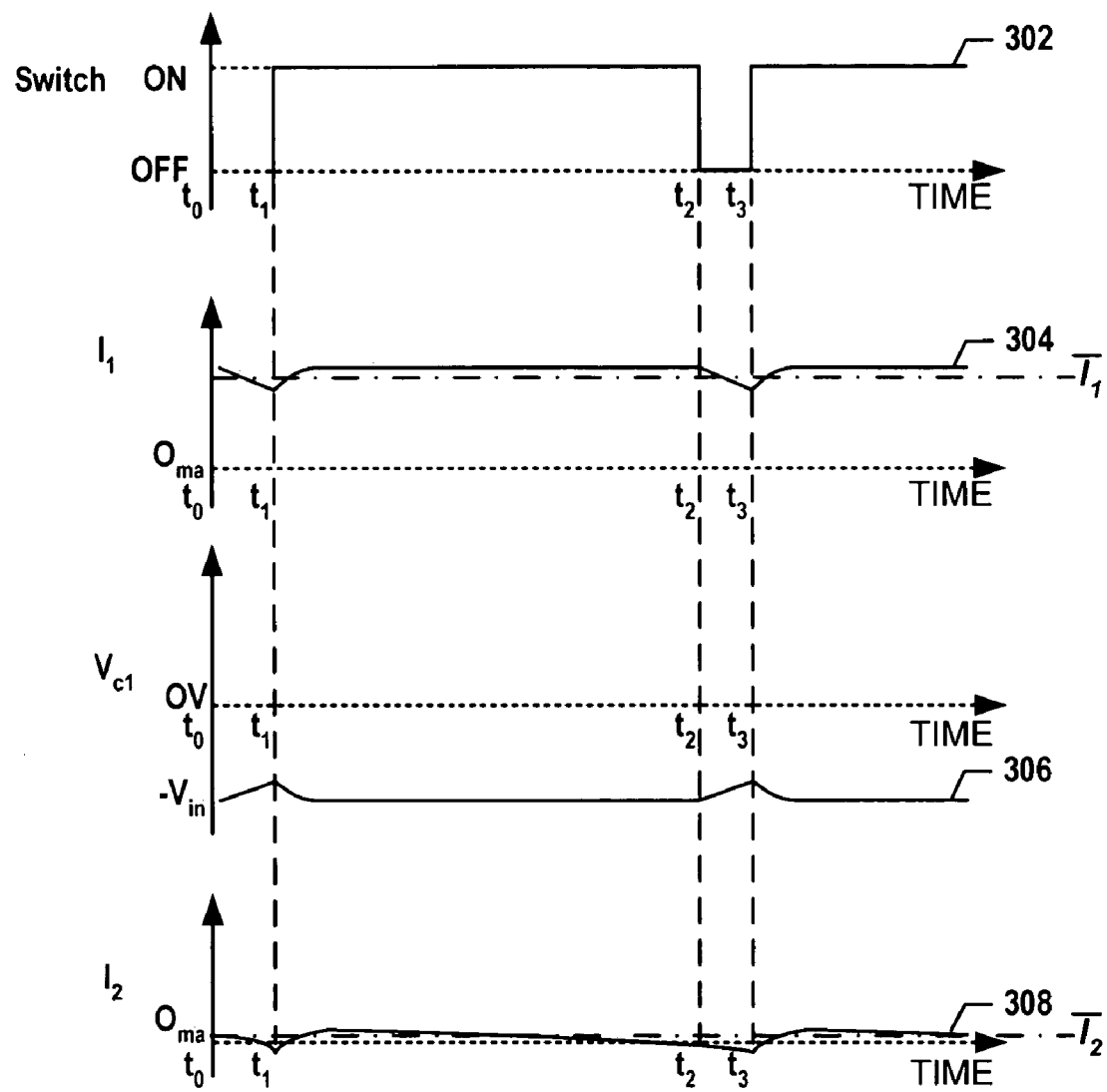
FIG. 3 is a first set of steady state curves illustrating various voltages and currents for operating the fail-safe drive system in accordance with an exemplary embodiment.

FIG. 3 is a first set of steady state curves 302–308 illustrating various currents and voltages of the fail-safe circuitry 142 operating at a high duty cycle, e.g., a duty cycle of about 80 to 100%. At this duty cycle the fail-safe circuitry 142 may actuate the first valve 112 in accordance with the VALVE SELECT mode.

Referring now to FIG. 3, a first S1 curve 302, a first $I_1$ curve 304, a first $V_{C1}$ curve 306, and a first $I_2$ curve 308 are shown according to the respective reference polarities illustrated in FIG. 2. The first S1 curve 302 represents the state, i.e., the on state or off state, of the switch 144. The first $I_1$ curve 304 represents the current $I_1$ flowing through first solenoid coil 146. Shown in conjunction with current $I_1$ is an average over time of the current $I_1$ ("$\overline{I_1}$"). The first $V_{C1}$ curve 306 represents the voltage across capacitor 152 "$V_{C1}$." The first $I_2$ curve 308 represents the current $I_2$ through the second solenoid coil 156. Like the first $I_1$ curve 304, current $I_2$ is shown in conjunction with an average over time of the current $I_2$ ("$\overline{I_2}$").

The steady state conditions of the curves shown in FIG. 3 occur after a brief transitory period of one or more switching cycles of the switch 144 to the high duty cycle. The steady-state operation of the fail-safe circuit 142 may occur by way of the following example. At time $t_1$, control signal $S_1$ causes the switch 144 to transition to an off state from an on state. The switch 144 remains in the on state until time $t_2$.

The current $I_1$ begins to increase through first solenoid coil 146 after the switch 144 transitions to $V_{in}$ at time $t_1$. Then after a short period, the current $I_1$ increases to a value that is approximately $V_{in}$ divided by the value of the first resistor 149. Given that $V_{in}$ and its corresponding input current are sufficient to source a pull-in current, the current $I_1$ flowing through the first solenoid coil 146 between time $t_1$–$t_2$ is sufficient to cause the first valve 112 to actuate.

In addition, the capacitor 152 charges through solenoid coil 156 to approximately $-V_{in}$ and remains at $-V_{in}$ until time $t_2$. Thus, only a small amount of current $I_2$ flows through the rectifier 154 and the second solenoid coil 156 since the second common node 176 and the common-low-side node 174 are at approximately the same potential. When the voltage on capacitor 152 reaches approximately $-V_{in}$, current $I_2$ decays to zero or a very low level. In practice, the current $I_2$ is less than the pull-in threshold and may be less than the hold-in threshold.

At time $t_2$, the switch 144 transitions from the on state to the off state and remains in the off state until time $t_3$. The input power supply 162 therefore no longer supplies $V_{in}$ between the first common node 172 and the common-low-side node 174. The voltage at the first common node 172 transitions from $V_{in}$ to a voltage equivalent to the voltage across the capacitor 152 $V_{C1}$ less a voltage across the rectifier 154 "$V_d$." Being almost charged to $V_{in}$, however, the capacitor 152 may help maintain the current $I_1$ above at least the hold-in threshold while it freewheels through rectifier 154 and capacitor 152. The freewheeling current $I_1$, in turn, reduces any potential established in capacitor 152. Accordingly, the current $I_2$ developed from the change in potential established in the capacitor 152 difference flows through the second solenoid coil 156 as shown in first $I_2$ curve 308.

Before the freewheeling current $I_1$ can decay any significant amount and appreciably affect the potential established the capacitor 152, the control signal $S_1$ causes the switch 144 to begin a new switch cycle. During such time, the capacitor 152 again charges toward $V_{in}$ and the current $I_1$ again becomes approximately $V_{in}$ divided by the value of the first resistor 149. The current $I_2$ reverses direction (i.e., flowing in the opposite direction of current $I_2$ flowing during the time $t_1$–$t_2$) and again decays to zero or a very low value.

Thus, the operation of the fail-safe circuit 142 at the high duty cycle allows the average current $\overline{I_1}$ flowing through first solenoid coil 146 over a switch cycle, such as the switch cycle from time $t_1$ to $t_3$, to rise above the pull-in threshold and remain at or above the pull-in and/or the hold-in thresholds. Consequently, the first valve 112 may transition to and remain in the actuated state.

Conversely, the second valve 122 remains in the unactuated state since the average current $\overline{I_2}$ does not meet or exceed the pull-in and/or hold-in thresholds. In the unactuated state, the second valve 122 is not open. Unless the first outlet port 116 is vented or the second valve 122 is inadvertently open, opening only the first valve 112 does not provide a path for the combustible fuel to flow.

(2) Independent Operation of the Second Valve

Figure 4:
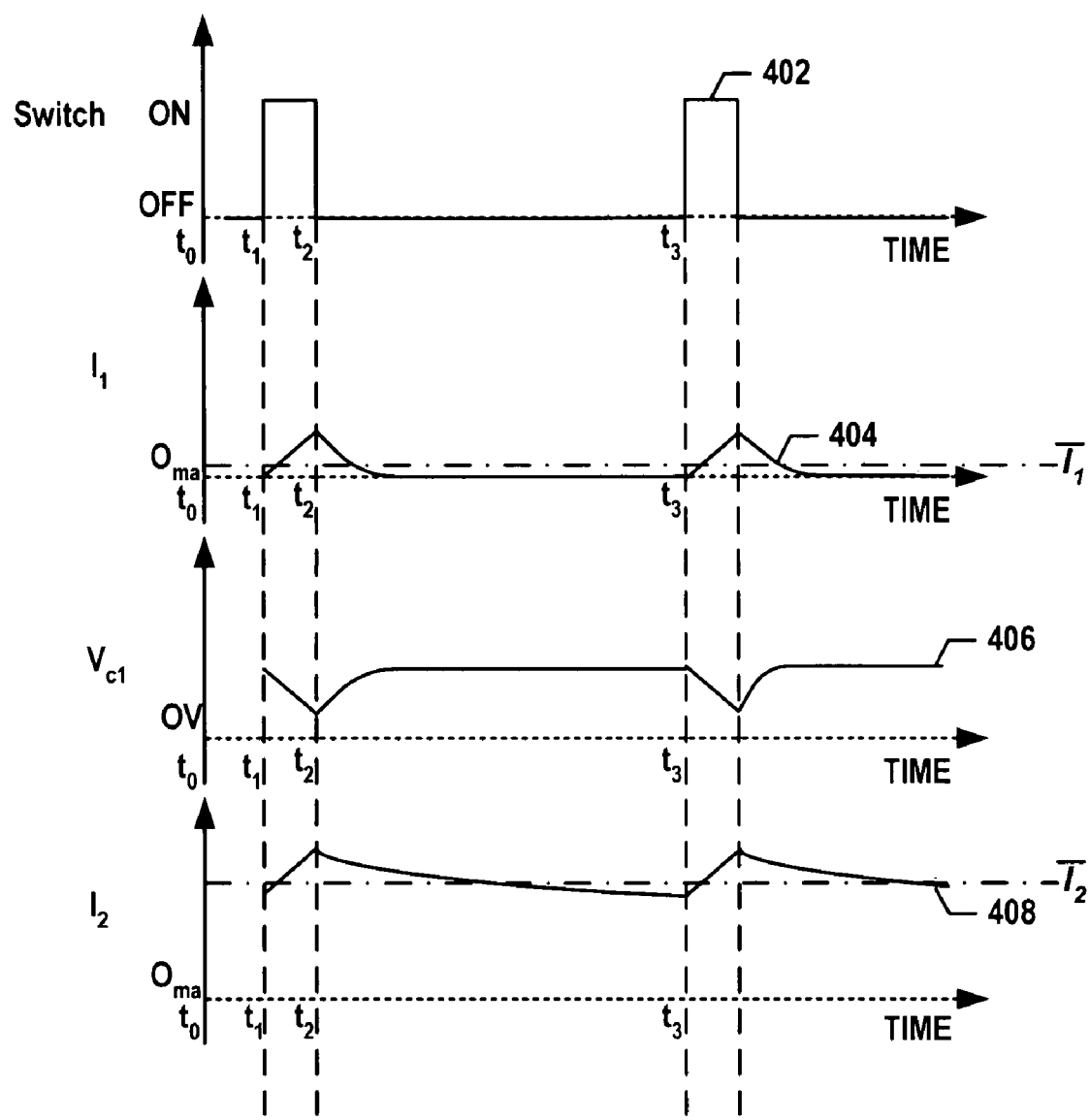
FIG. 4 is a second set of steady state curves illustrating various voltages and currents for operating the fail-safe drive system in accordance with an exemplary embodiment.

FIG. 4 is a second set of steady state curves 402–408 illustrating various currents and voltages of the fail-safe circuitry 142 operating at a low duty cycle, e.g., a duty cycle of about 10 to 30%. At this duty cycle the fail-safe circuitry 142 may actuate the second valve 122 in accordance with the VALVE SELECT mode.

In FIG. 4, a second S1 curve 402, a second $I_1$ curve 404, a second $V_{C1}$ curve 406, and a second $I_2$ curve 408 are shown according to the respective reference polarities illustrated in FIG. 2. The second S1 curve 402 represents the on state and off state of the switch 144. The second $I_1$ curve 404 represents the current $I_1$ flowing through first solenoid coil 146. Shown in conjunction with current $I_1$ is the average current $\overline{I_1}$. The second $V_{C1}$ curve 406 represents the voltage across capacitor 152 "$V_{C1}$." The second $I_2$ curve 408 represents the current $I_2$ through the second solenoid coil 156. Like the first $I_1$ curve 404, current $I_2$ is shown in conjunction with the average current $\overline{I_2}$.

The steady state condition of the curves illustrated in FIG. 4 occur after a brief transitory period of one or more switching cycles at the low duty cycle. At time $t_1$, the switch 144 transitions from an off state to an on state. The voltage between the first common node 172 and the common-low-side node 174 transitions from about 0 volts to about $V_{in}$ and remain at $V_{in}$ until time $t_2$.

After the transition at time $t_1$, the current $I_1$ increases in first solenoid coil 148, as shown in the second $I_1$ curve 404. In addition, $V_{in}$ is put in series with the potential established in the capacitor 152. This results in a potential higher than $V_{in}$ being dropped across the second solenoid coil 156. Consequently, the current $I_2$ passing through the second solenoid coil 156 rises above the pull-in threshold. But given the short duration of the on state of the switch 144, the current $I_1$ does not rise above the pull-in threshold.

At time $t_2$, the switch 144 transitions from the on state to an off state. The current $I_1$ freewheels through rectifier 154 as the voltage at the first common node 172 attempts to approach minus infinity volts. This boosts the charge on the capacitor 152 $V_{C1}$ as shown in curve 406. The freewheeling current $I_1$, however, will decay rapidly as compared with the current $I_2$ passing through the second solenoid coil 156 given the negative polarity of the charge on the capacitor 152 at the first common node 172. And because the switch 144 is open for a long duration, the freewheeling current $I_1$ may decay to zero before the control signal $S_1$ causes the switch 144 to begin a new switch cycle, as shown by the second $I_1$ curve 402.

Consequently, at the low duty cycle, the average current $\overline{I_2}$ through the second solenoid coil 156 remains above the pull-in threshold, and average current $\overline{I_1}$ is kept below the hold-in-threshold. This, in turn, causes the second valve 122 to operate in the actuated state, while the first valve 112 remains in the unactuated state.

B. Off Mode

Figure 5:
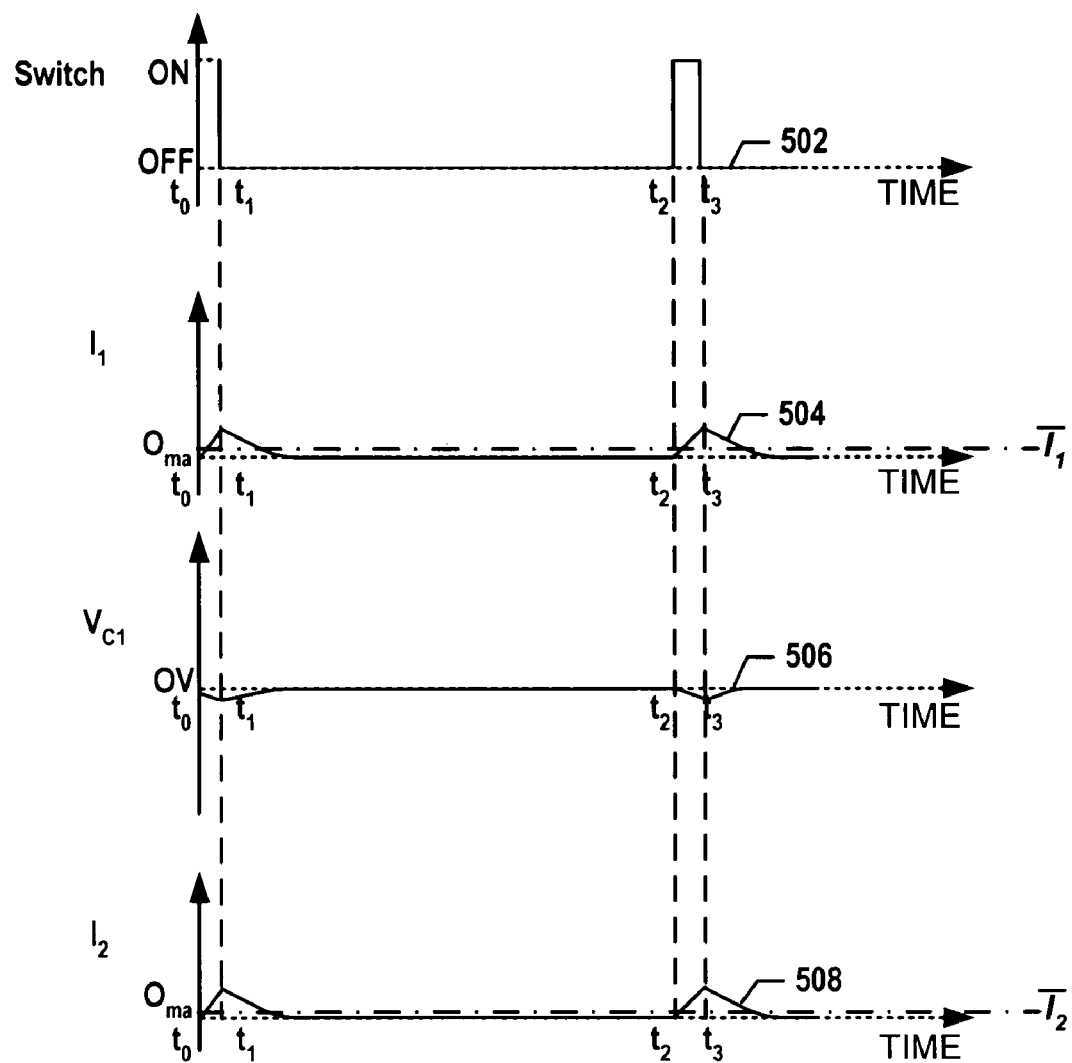
FIG. 5 is a third set of steady state curves illustrating various voltages and currents for operating a fail-safe drive system in accordance with an exemplary embodiment.

FIG. 5 is a third set of steady state curves 502–508 illustrating various currents and voltages of the fail-safe circuitry 142 operating at a very low duty cycle, e.g., a duty cycle of about 0 to 5%. At this duty cycle the fail-safe circuitry 142 does not drive either of the first and second valves 112, 122 to an actuated state in accordance with the OFF mode.

The curves shown in FIG. 5 include a third S1 curve 502, a third $I_1$ curve 504, a third $V_{C1}$ curve 506, and a third $I_2$ curve 508. Each of these curves is shown according to its respective reference polarities illustrated in FIG. 1. The third S1 curve 502 represents the on state and off state of the switch 144. The third $I_1$ curve 504 represents the current $I_1$ flowing through first solenoid coil 146. The third $V_{C1}$ curve 506 represents the voltage across capacitor 152 $V_{C1}$. In addition, the third $I_2$ curve 508 represents the current through the second solenoid coil 156. Shown in conjunction with the current $I_1$ and current $I_2$ are the average currents $\overline{I_1}$, $\overline{I_2}$, respectively.

When the switch 144 opens for extended periods of time, the currents $I_1$, $I_2$ and voltage across the capacitor 152 $V_{C1}$ rise to only a very low level. At this very low level, the currents $I_1$, $I_2$ stay below the hold-in and pull-in thresholds. Thus, the first and second valves 112, 122 do not actuate.

C. Operational Mode

Figure 6:
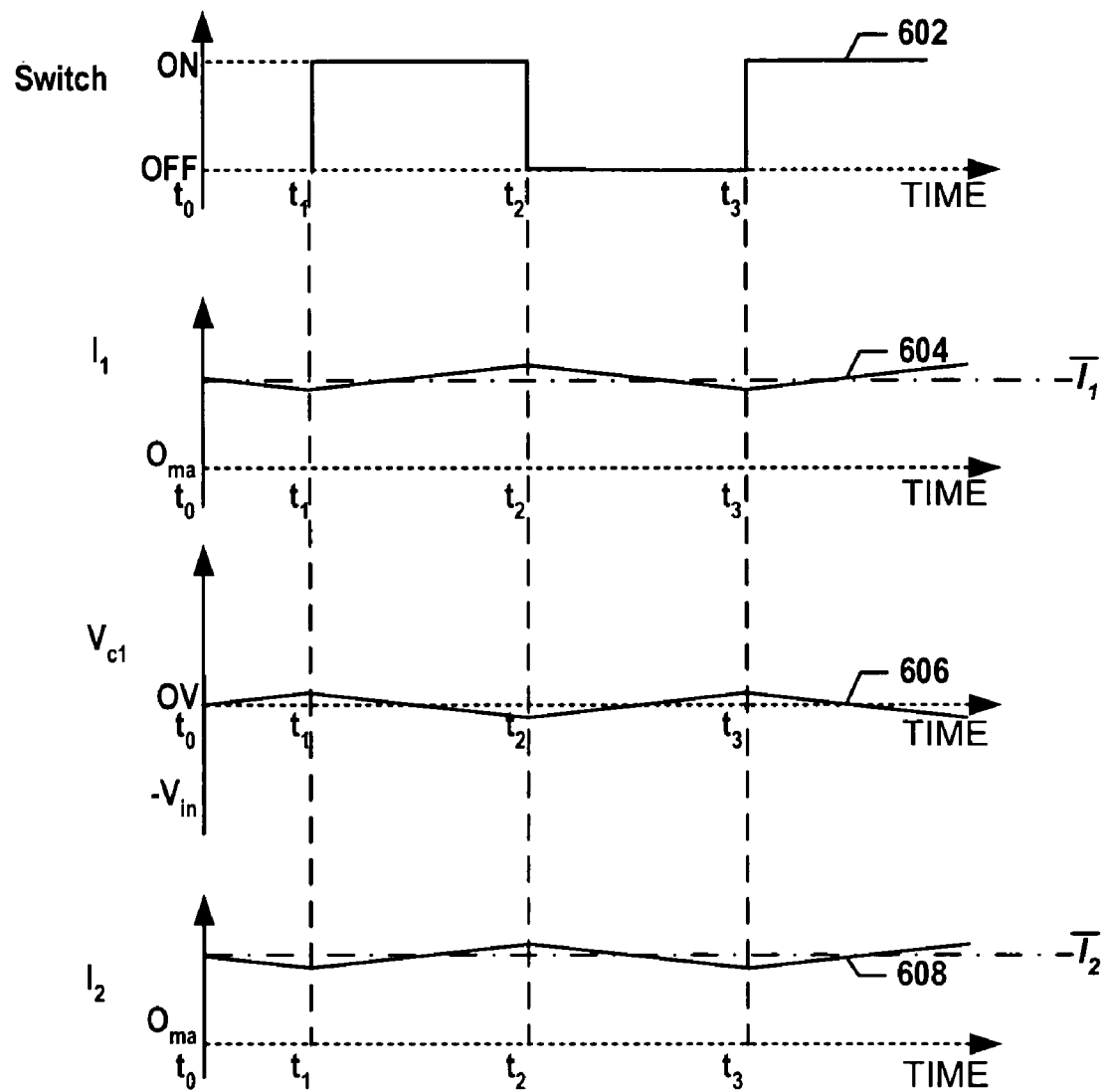
FIG. 6 is a fourth set of steady state curves illustrating various voltages and currents for operating a fail-safe drive system in accordance with an exemplary embodiment.

FIG. 6 is a fourth set of steady state curves 602–608 illustrating various currents and voltages of the fail-safe circuitry 142 operating at a midrange duty cycle, e.g., a duty cycle from about 40 to 60%. At this duty cycle the fail-safe circuitry 142 may actuate both the first and second valves 112, 122 in accordance with the OPERATIONAL mode.

Referring FIG. 6, a fourth S1 curve 602, a fourth $I_1$ curve 604, a fourth $V_{C1}$ curve 606, and a fourth $I_2$ curve 608 are shown according to the respective reference polarities illustrated in FIG. 2. The second S1 curve 602 represents the on state and off state of the switch 144. The second $I_1$ curve 604 represents the current $I_1$ flowing through first solenoid coil 146. Shown in conjunction with current $I_1$ is the average current $\overline{I_1}$. The second $V_{C1}$ curve 606 represents the voltage across capacitor 152 $V_{C1}$. The second $I_2$ curve 608 represents the current $I_2$ through the second solenoid coil 156. Like the first $I_1$ curve 604, current $I_2$ is shown in conjunction with the average current $\overline{I_2}$.

Like each of the other state diagrams, the fourth set of the steady state curves of FIG. 6 assume a steady state condition, which occurs after a brief transitory period of one or more switching cycles. At time $t_1$, the switch 144 transitions from an off state to an on state and remains in the on state until time $t_2$. This, in turn, causes the voltage at the first common node 172 to transition to and remain at $V_{in}$ until time $t_2$.

The current $I_1$ rises above the pull-in threshold in response to $V_{in}$ being applied across the first solenoid coil 146. And the current $I_2$ rises above the pull-in threshold in response to the input voltage $V_{in}$ and the voltage across the capacitor 152 $V_{c1}$ being applied across second solenoid coil 156. At the same time, the voltage $V_{c1}$ may change from a low positive voltage to a low negative voltage. This, however, may not substantially affect the first and second currents $I_1$ or $I_2$.

At time $t_2$, the switch 144 transition from the on state to the off state, and thereafter remains in the off state until the next switch cycle at time $t_3$. Given that current cannot change instantaneously in inductors, the current $I_1$ freewheels through rectifier 154 and the capacitor 152, and then returns to the first the solenoid coil 146. As this happens, the freewheeling current $I_1$ flowing through the rectifier 154 may slightly charge the capacitor 152, as shown in the fourth $V_{C1}$ curve 306. Also, the current $I_2$ freewheels through rectifier 154. Consequently, both the first and second average currents $\overline{I_1}$, $\overline{I_2}$ stay above the pull-in and hold-in thresholds. Thus, both the first and second valves 112, 122 are in an actuated state. As such, the first and second valves 112, 122 are open, which in turn, allows combustible fuel to flow to the piece of combustible-fuel-fired equipment 106.

D. Passive Current Limiting Circuit

Figure 7:
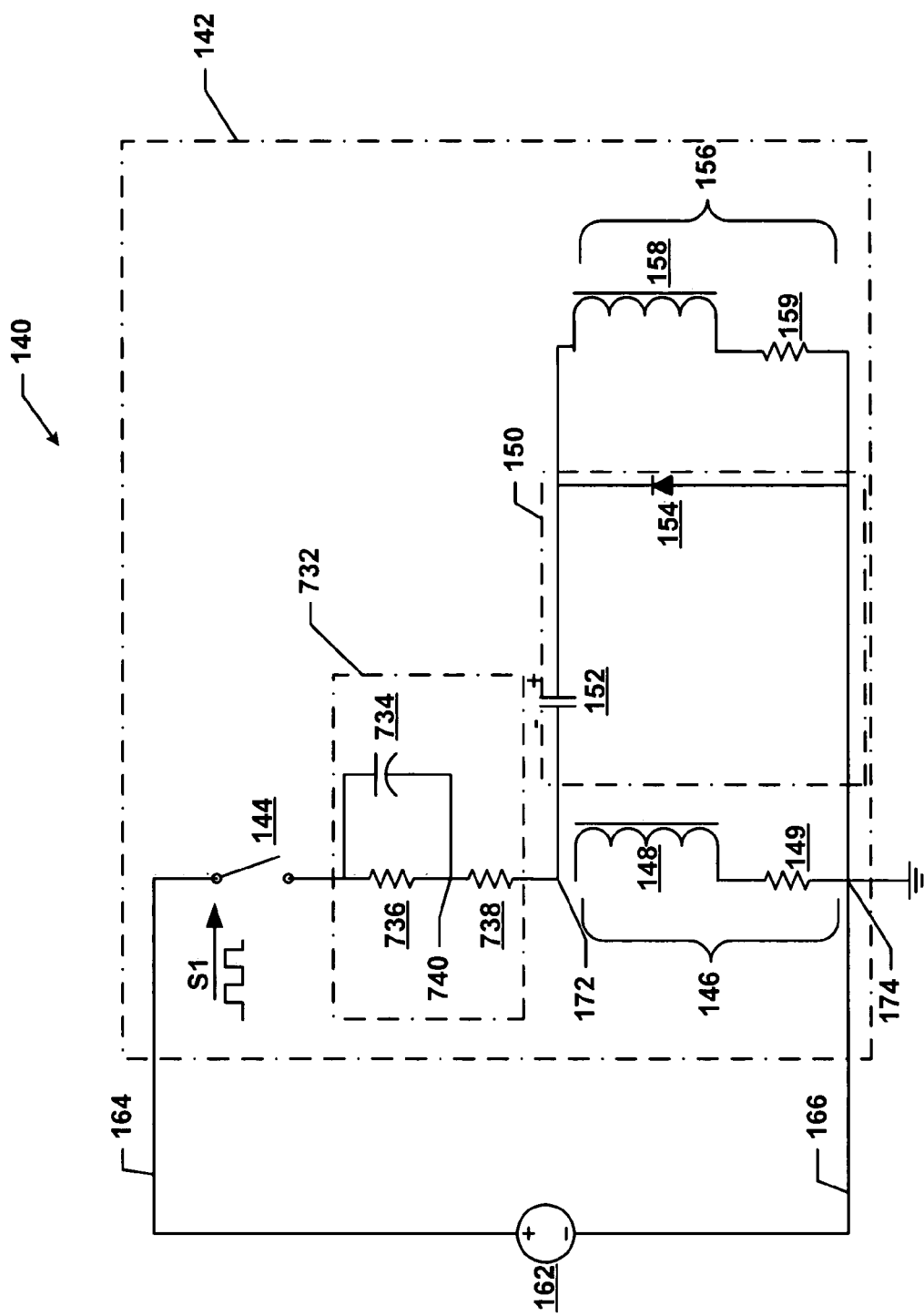
FIG. 7 is a third block diagram illustrating a third exemplary fail-safe drive system with passive-current-limiting circuitry.

Using supplemental circuitry, additional fail-safe protection may be provided to enhance the level of fail-safe protection already provided by the architecture, arrangement and operation of the fail-safe circuit 142. Referring to FIG. 7, a third embodiment of the fail-safe-drive system 140 is illustrated. The fail-safe-drive system 140 may be deployed as the fail-safe circuit 142 as shown in FIG. 2 in combination with a passive-current-limiting circuit 732.

The passive-current-limiting circuit 732 and may include a parallel combination of a first-current-limiting resistor 736 and a second capacitor 734 in series with a second-current-limiting resistor 738. This combination may be coupled between the switch 144 and the first-common node 172. In particular, the first-current-limiting resistor 736 has its first end coupled to the switch 144 and its second end coupled to a third-common node 740. The second-current-limiting resistor 738 has its first end coupled to the third common node 740, and its second end coupled to the first-common node 172. The second capacitor 734 has its first end coupled to the switch 144 and its second end coupled to the third-common node 740.

The second capacitor 734 may be a polarized type, as opposed to the type of the first capacitor 152. Polarized capacitors, as know in the art, are significantly less expensive than their non-polarized counterparts are. Thus, it would be desirable to use the less expensive polarized capacitor to save costs, when possible. The second capacitor 734, however, may be a non-polarized type.

As noted above, the input power supply 162 may source an input electrical signal that is able to provide a current to the first solenoid coil 146 that is much greater than the pull-in current. Sourcing such a current may be necessary to supply a current greater than the pull-in threshold for the second solenoid coil 156, especially during low or midrange duty cycles. In such case, however, the current $I_1$ flowing though the first solenoid coil 146 may be wasting energy through joule loss. This may reduce the life the solenoid coil 146 of the first valve 112 and resultant operation and reliability of the fail-safe circuit 142.

By employing the passive-current-limiting circuit 732, the current sourced from the input power supply 162 passes through the first and second current-limiting resistors 736, 738 limiting the amount of current $I_1$ flowing through the first solenoid coil 146. Being in parallel with the first current-limiting resistor 736, the second capacitor 734 may reduce the total impedance of the current limiting circuit 732 at lower duty cycles when less current limiting may be desired, and have a lesser effect as the duty cycle increases when more current limiting may be desired. The passive-current-limiting circuit 732 may allow a progressively smaller voltage to be dropped across first solenoid coil 146 as duty cycle increases, so that the current $I_1$ can sufficiently rise above the pull-in threshold. The current $I_1$, however, might not significantly exceed the pull-in threshold. The amount of voltage drop reduced by the passive current-limiting network at high and low duty cycles can be adjusted by the voltage-divider ratio of the first and second current-limiting resistors 736, 738.

The values for the first and second current-limiting resistors 736, 738 and capacitor 732 may be chosen to match the first and second solenoid coils 145, 156 and energy-transfer device 150 so that at any duty cycle, the first and second currents $I_1$, $I_2$ may be at a safe level. This safe level may be, for example, at 1.5 times of the pull-in current level. An exemplary set of component values is provided in the Table. 2 below.

TABLE 2

| Component | Value |
|---|---|
| Vin | 10 volt |
| Resistor 736 | 200 ohms |
| Resistor 738 | 160 ohms |
| Capacitors 734, 152 | 3.3 uF |
| Solenoid coils 148, 158 | 250 mH |
| Resistors 149, 159 | 12 ohms |
| Rectifier 154 | 1N5817 |
| Switch 144 | Rds_on < 0.2 ohm |
| Pull-in current | 25 mA |
| Hold current | 5 mA |

Additionally, the fail-safe circuit 142 may limit the first and second currents $I_1$, $I_2$ so that the first and second valves 112, 122 are not pulled-in simultaneously at any duty cycle. For instance, control signals S1 may be issued in a certain sequence so that only one of the first and second valves 112, 122 can be pulled-in at any time. In one exemplary sequence, the fail-safe circuit 142 may be first operated a duty cycle from about 95% to pull-in only the first valve 112. Next, the duty cycle may be reduced to about 25% to pull-in the second valve 122, while holding the first valve 122 above the hold-in threshold. Lastly, the duty cycle may then be increased to about 50% to keep both the first and second valves 112, 122 actuated.

At the 50% duty cycle, the first and second currents $I_1$, $I_2$ are below the pull-in threshold, but are maintained above the hold-in thresholds. Using the exemplary values in Table 2, the first and second currents $I_1$, $I_2$ at the 50% duty cycle may be at about 18 mA, which is below the pull-in thresholds, yet above the hold-in thresholds. Thus, the first and second valves 112, 122 will not be pulled in at the 50% duty cycle without first experiencing the other duty cycles.

E. Fail-Safe Protection

In fail-safe systems generally, unsafe conditions have to be prevented when any component of such system fails. In the present context, when a failure condition occurs, the fail-safe circuit 142 may be shut down or otherwise prevented from unsafe operation. The fail-safe circuit 142 may be shut down immediately or, alternatively, after the completion of the current operation cycle. The fail-safe drive system 140 can be consider fail-safe, if, for example, the operation of the system is inhibited after a failure of one or more components of the fail-safe drive system 140 is detected.

In an exemplary direct-ignition-valve-control system, the fail-safe circuit 142 may be used in conjunction with direct ignition and flame sensing technologies to test for proper operation of the system. The proper operation of the systems may be detected by independently actuating each of the first and second valves 112, 122, and then checking the gas flow to the fuel-fired apparatus. Using such a scheme, the system may be shut down if either of the first and second valves 112, 122 fails to actuate, when requested, or if the fail-safe circuitry fails to open either of the first or second valves 112, 122.

These conditions may be detected using the following sequence of operating the fail-safe circuitry 142. First, operate the fail-safe circuitry 142 at, for example, a 0 duty cycle so that both the first and second valves 112, 122 are closed. Next, change the fail-safe circuitry 142 to a duty cycle of about 95% so as to actuate only the first valve 112. After actuating the first valve 112, attempt to ignite the combustible fuel and attempt to sense for the presence of a flame. If a flame is sensed, then the second valve 122 or the fail-safe circuit 112 has failed. In such case, the operation of the fuel-fired apparatus 106 may be inhibited, halted or otherwise stopped. The fail-safe-drive system 140 may then provide a fault indicator, e.g., an illuminating light-emitting diode, to alter that the fuel-fired apparatus 106 may need to be serviced.

If flame is not sensed, then change the duty cycle of the fail-safe circuitry 142 to 0% to de-actuate the first valve 112 and then change to a low duty between about 20 to 30% to actuate the second valve 122. Again, attempt to ignite the combustible fuel and sense a flame. If a flame is sensed, then the first valve 112 or the fail-safe circuit 142 has failed. On the other hand, if a flame is not sensed, then the fail-safe-drive system 140 may proceed to the normal operation.

Further, when any of the components of the safe circuit 142 fails, combustible fuel should not flow from the upstream supply 104 to the combustible fuel-fired apparatus 106. As noted above, the switch 144 is controlled by the control signal $S_1$. If, for example, the switch 144 or signal generator that issues the control signal $S_1$ fails, then the switch 144 may stay in the on-state. This, in turn, may cause a constant application of $V_{in}$ across the first solenoid coil 146. Responsively, the fail-safe circuit 142 may transition to VALVE SELECT MODE and operate only the first valve 112 instead of operating both the first and second valves 112, 122. If the switch 144 fails as an open circuit as a result of the signal generator or the switch 144 itself, then the fail-safe circuit 142 may transition to the OFF MODE.

Moreover, an examination of failure modes for each of the components of the fail-safe circuit 142 will show that when a component of the fail-safe circuit 142 fails, no more than one of the first and second valves 112, 122 will operate in an actuated mode. TABLE 3 lists possible single-component failure modes for the fail-safe circuitry 142 with the passive current limit circuitry 732.

This second switch may be used to short the first solenoid coil 146 when both the switch 144 and capacitor 152 fail shorted. Consequently, both of the first and second valves 112, 122 can not be actuated simultaneously. But if already actuated, the second switch allows the fail-safe circuitry to shut down the first and second valves 112, 122 by shorting the node 172 to 174.

(1) High Side Drive Circuit

Figure 8:
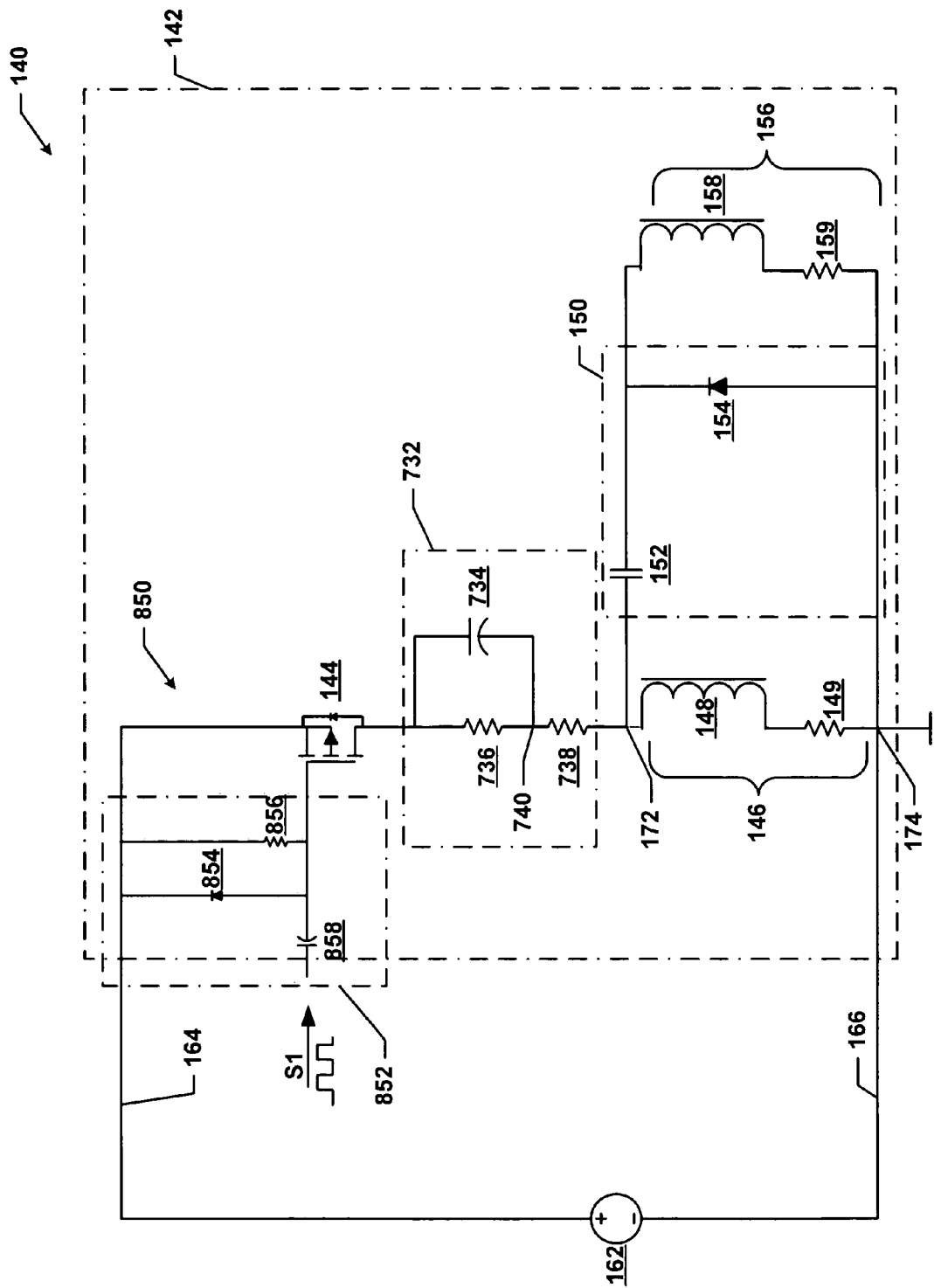
FIG. 8 is a fourth block diagram illustrating a fourth exemplary fail-safe drive system with passive-current-limiting circuitry and high-side drive circuitry.

FIG. 8 illustrates a fourth embodiment of the fail-safe-drive system 140 in which another level of fail-safe protection may be provided. In this exemplary embodiment, the fail-safe-drive system 140 may be deployed with the fail-safe circuit 142 as shown in FIG. 2 in combination with the passive-current-limiting circuit 732 and a high-side-drive circuit 850. The high-side-drive circuit 850 is particularly useful when both of the first and second solenoid coils 146, 156 have a common ground.

The high-side-drive circuit 850 includes the switch 144 in the form of a P-channel enhancement type MOSFET ("P-channel MOSFET") and an AC coupling network 852. The P-channel MOSFET 144 may have its drain coupled to the passive-current-limiting circuit 732, its source coupled to the high-side supply conductor 164, and its gate coupled to the AC coupling network 852.

The AC coupling network 852 may include an AC coupling rectifier 854, an AC coupling resistor 856, and an AC coupling capacitor 858. The AC coupling rectifier 854 may be coupled between the gate and source of the P-channel MOSFET such that the AC coupling rectifier 854 will allow a forward bias current to flow from the gate to the source. The AC coupling resistor 856 may be coupled between the gate and source of the P-channel MOSFET. The AC coupling capacitor 858 may have a first end coupled to the gate of the P-channel MOSFET and a second end for receiving the control signal $S_1$ from the signal generator.

TABLE 3

| First failed Component | At least one valve is closed or can be controlled? | Description |
|---|---|---|
| First solenoid coil 146 shorted | Yes, both valves closed | |
| First solenoid coil 146 open | Yes, both valves closed | |
| second solenoid coil 156 shorted | Yes, second valve closed | |
| Second solenoid coil 156 open | Yes, second valve closed | |
| Rectifier 154 open | Yes, second valve closed | Average second current is zero |
| Rectifier 154 shorted | Yes, second valve closed | Average second current is zero |
| Capacitor 152 open | Yes, second valve closed | second current is zero |
| Capacitor 152 shorted | Yes, both valves can be closed by 144 | |
| Switch 144 open | Yes, both valves closed | |
| Switch 144 shorted | Yes, second valve closed | |
| Resistor 736 open | Yes, both valves closed | |
| Resistor 736 shorted | Yes, both valves can be closed by 144 | First and second currents are higher |
| Resistor 738 open | Yes, both valves closed | |
| Resistor 738 shorted | Yes, both valves can be closed by 144 | First and second currents are higher |
| Capacitor 734 open | Can not pick valve 156 | |
| Capacitor 734 shorted | Yes, both valves can be closed by 144 | First and second currents are higher |

In an alternative embodiment, an optional second electronic switch (not shown) may be inserted between nodes 172 and 174 to increase safety when two components fail.

The AC coupling network 852 ensures that the P-channel MOSFET 144 can only be turned on when the control signal $S_1$ has an alternating signature. Thus, if the signal generator (e.g., microprocessor) issuing the control signal $S_1$ fails to provide an alternating signature, the switch 144 will remain in its off state. Further, the AC coupling network 852 ensures that the P-channel MOSFET 144 needs a negative voltage between its gate relative to its source to turn on.

(2) Low Side Drive Circuit

Figure 9A:
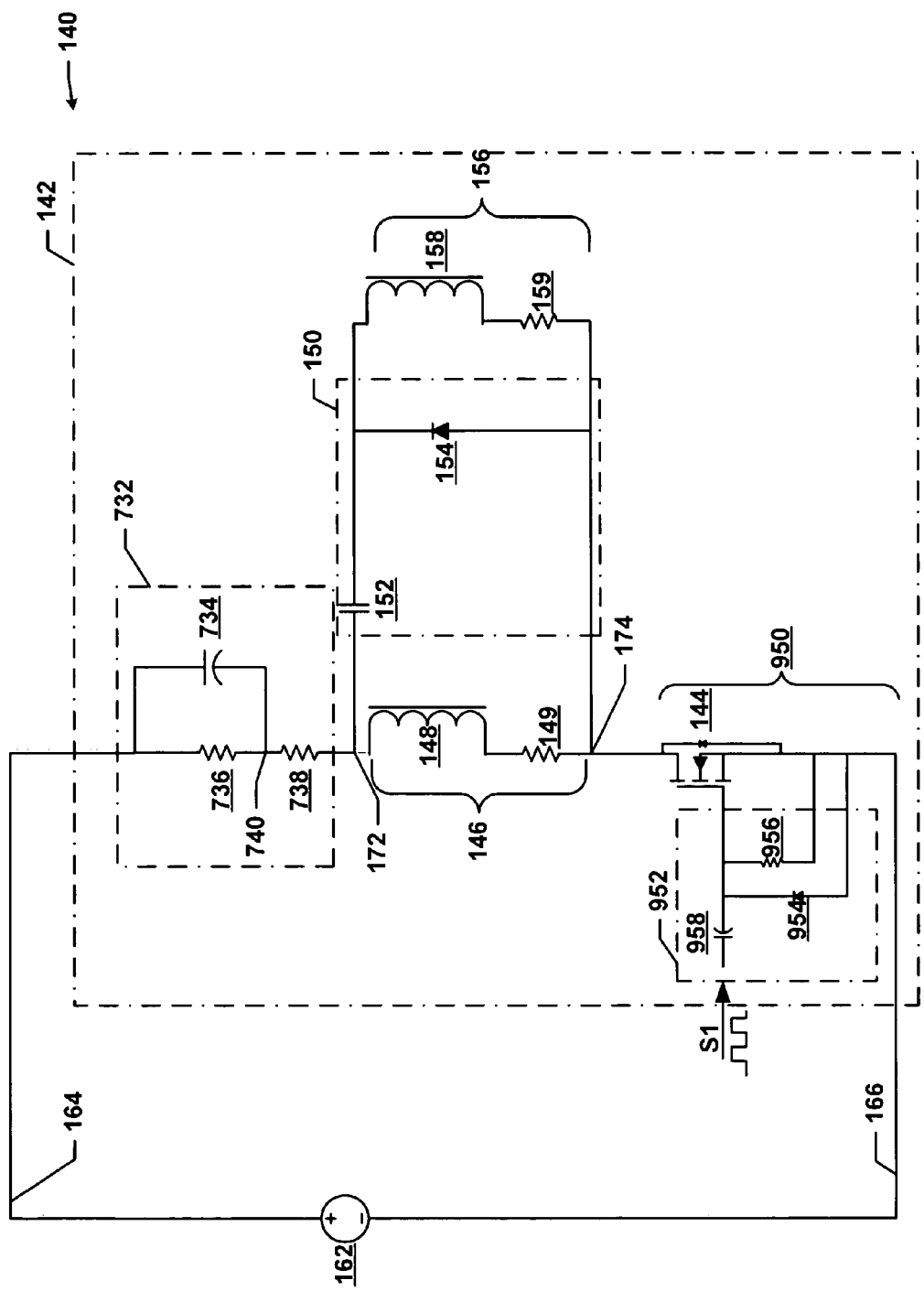
FIG. 9A is a fifth block diagram illustrating a fifth exemplary fail-safe drive system with passive-current-limiting circuitry and low-side drive circuitry.
Figure 9B:
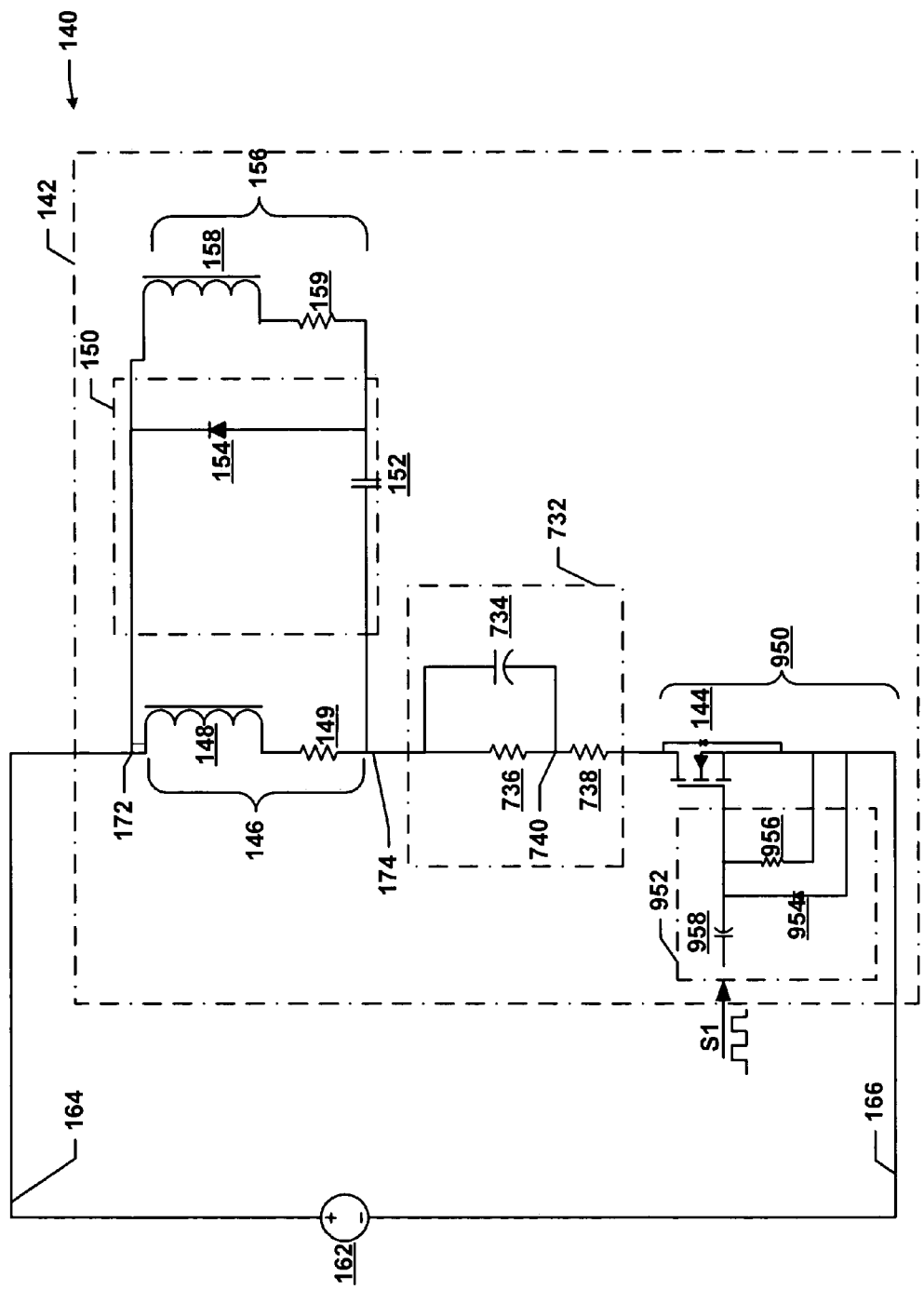
FIG. 9B is a sixth block diagram illustrating a sixth exemplary fail-safe drive system with passive-current-limiting circuitry and low-side drive circuitry.

FIGS. 9a and 9b illustrate fifth and sixth embodiments of the fail-safe-drive system 140 in which an alternative level of fail-safe protection may be provided. In the fifth embodiment, the fail-safe-drive system 140 includes the fail-safe circuit 142 as shown in FIG. 2 in combination with the passive-current-limiting circuit 732 and a low-side-drive circuit 950.

In the sixth embodiment, instead of the capacitor 152 being coupled between the first common node 172 and the rectifier 154 as shown in FIG. 2, the capacitor 152 may be coupled between the common low-side-node 174 and the rectifier 154 as shown in FIG. 9. Also, the passive-current-limiting circuit 732 may be inserted between the common low-side-node 174 and the low-side-drive circuit 950 as shown. Other configurations for the low-side-drive circuit 950 are possible as well.

The low-side-drive circuit 950 is particularly useful when the first and second solenoid coils 146, 156 do not have a common ground connection. The low-side-drive circuit 950 may include the switch 144 in the form of an N-channel enhancement type MOSFET (N-channel MOSFET) and an AC coupling network 952. The N-channel MOSFET 144 may have its drain coupled to the common low-side-node 174, its source coupled to the low-side supply conductor 166, and its gate coupled to the signal generator through the AC coupling network 952.

The AC coupling network 952 may include an AC coupling rectifier 954, an AC coupling resistor 956, and an AC coupling capacitor 958. The AC coupling rectifier 954 may be coupled between the gate and source of the N-channel MOSFET such that the AC coupling rectifier 954 will allow a forward-bias current to flow from the source to the gate. The AC coupling resistor 956 may be coupled between the gate and source of the N-channel MOSFET. The AC coupling capacitor 958 has a first end coupled to the gate of the N-channel MOSFET and a second end for receiving the control signal $S_1$ from the signal generator.

The AC coupling network 952 ensures that the N-channel MOSFET 144 can only be turned on when the control signal $S_1$ has an alternating signature. Thus, if the signal generator (e.g., microprocessor) issuing the control signal $S_1$ fails to provide an alternating signature, the switch 144 will remain in its off state. Further, the AC coupling network 952 ensures that the N-channel MOSFET 144 needs a positive voltage between its gate relative to its source to turn on.

(3) Active Current Regulation Circuit

Figure 10:
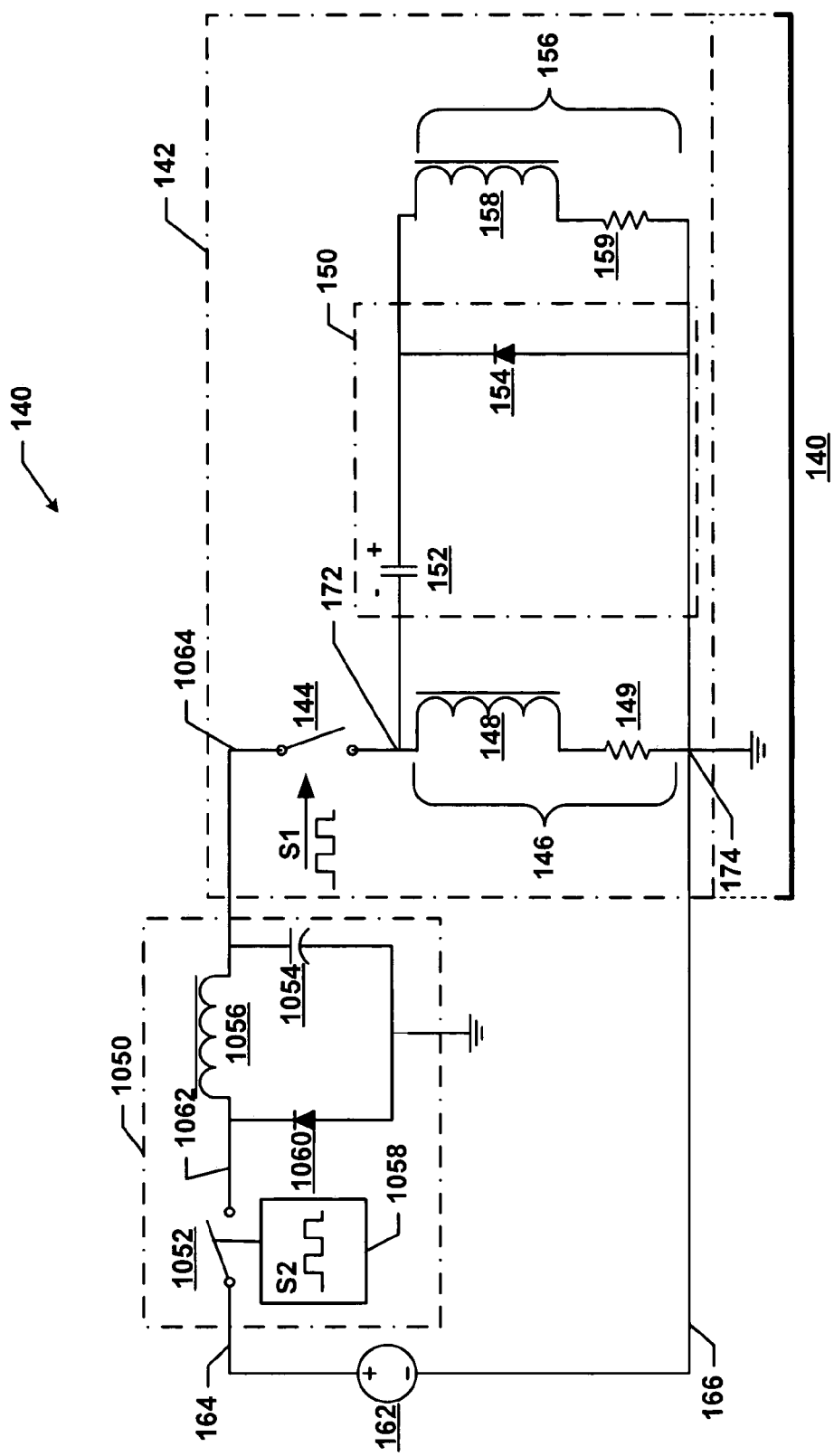
FIG. 10 is a seventh block diagram illustrating a seventh exemplary fail-safe drive system with active-current-regulation circuitry.

FIG. 10 illustrates a seventh embodiment of the fail-safe-drive system 140 in which an alternative level of fail-safe protection and additional overall efficiency for the fail-safe drive system may be provided. The fail-safe-drive system 140 includes the fail-safe circuit 142 as shown in FIG. 2 in combination with an active-current-regulation circuit 1050. The active-current-regulation circuit 1050 is particularly useful for controlling and regulating the current needed to pull-in and hold-in the first and second solenoid coils 146, 156.

The active-current-regulation circuit 1050 may be a DC-DC converter. In one embodiment, the DC-DC converter may include a step down regulator configured in a standard buck-type configuration. In this standard buck-type configuration, the regulator includes a buck-regulator switch 1052, a buck-regulator capacitor 1054, a buck-regulator inductor 1056, a buck-regulator controller 1058, and a buck-regulator rectifier 1060.

The output of the buck regulator, which may be controlled by duty cycles of control signals $S_2$, may be able to power the fail-safe circuit 142 with various voltages and corresponding current requirements by employing the duty ratio designed into the DC-DC converter. For instance, when operating the fail-safe circuit at a high duty cycle, control signals $S_2$ may be adjusted to supply enough current to the first common node 172 to actuate the first valve 122. After the first valve 112 is actuated, then the control signals $S_2$ may be used to adjust the duty ratio of the buck regulator to lower the current supplied to the first common node 172 so as to drive a hold-in current and reduce wasteful heating losses. This active regulation may be used in each of the various modes described above. The following table illustrates the relative regulation the duty ratio of the buck regulator for each of the modes discussed above.

TABLE 4

| Fail Safe Mode | Duty Cycle of Fail-Safe Circuit 142 | Regulator Duty Ratio |
| --- | --- | --- |
| Valve Selection | High | Low for Pull-in and then Lower for Hold-in |
|  | Low | High for Pull-in and then Midrange for Hold-in |
| Operational | Midrange | Midrange for Pull-in and then Lower for Hold-in |
| OFF | Off | None |

F. Alternative Architecture

Figure 11:
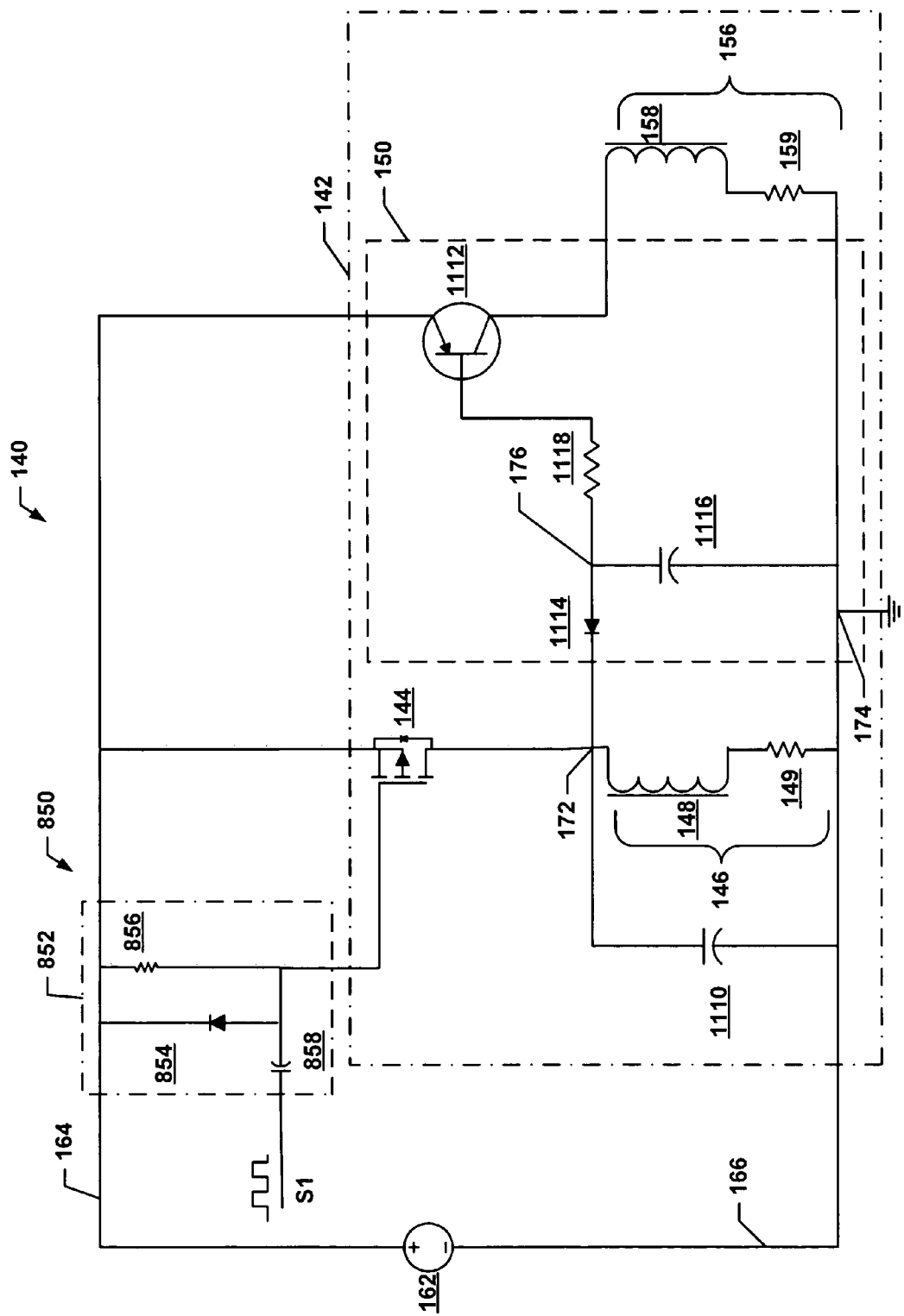
FIG. 11 is an eight block diagram illustrating a eighth exemplary fail-safe drive system for low input voltage applications.
Figure 12:
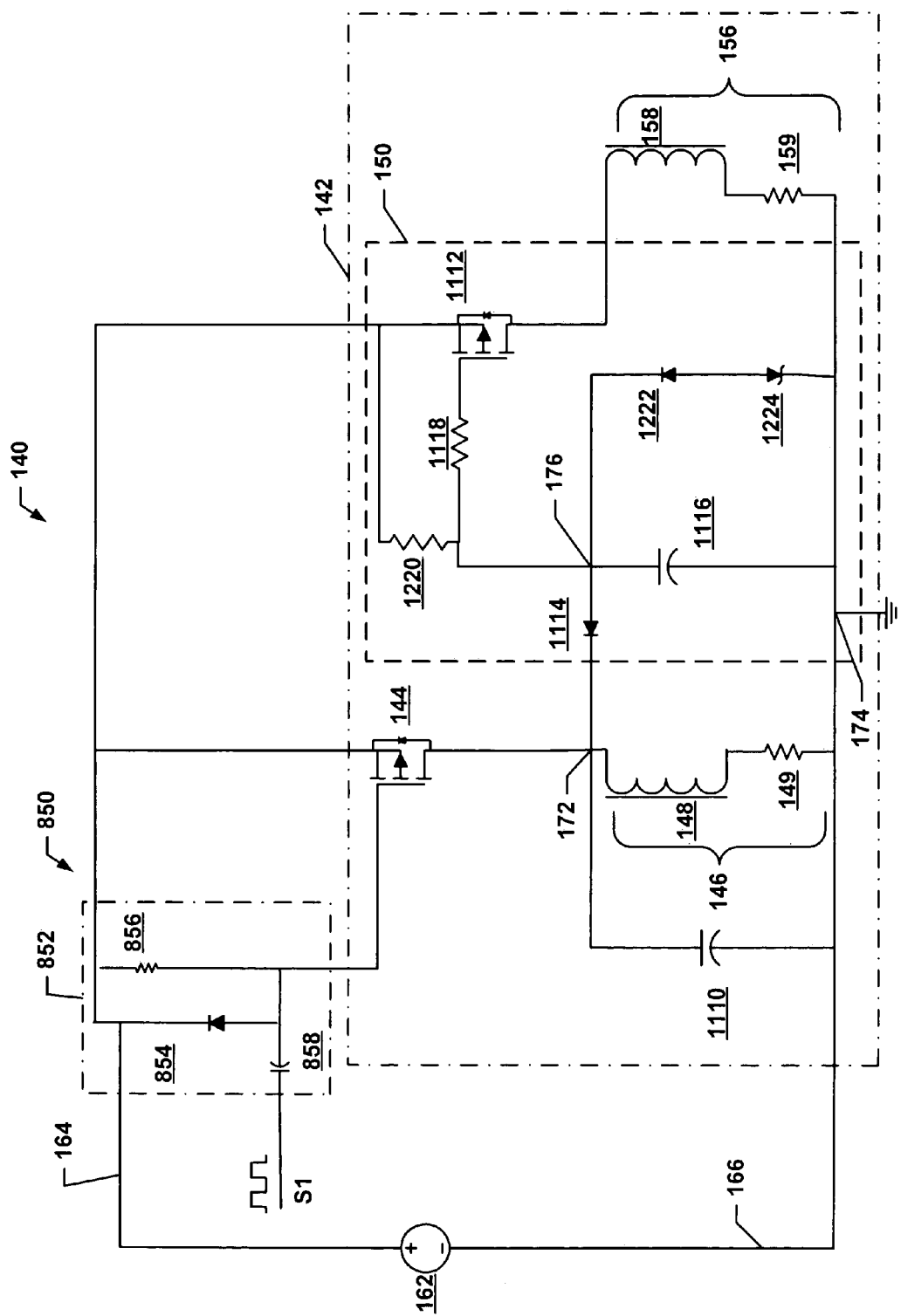
FIG. 12 is a ninth block diagram illustrating a ninth exemplary fail-safe drive system for low input voltage applications.

FIGS. 11 and 12 illustrate two exemplary embodiments of fail-safe-drive system 140. These embodiments are particularly useful for low input voltage applications. Like other embodiments, the fail-safe-drive system 140 may control the operation of the first and the second solenoid-controlled valves 112, 122 by facilitating the actuating and/or de-actuating of the first and second solenoid-controlled valves 112, 122. Independent actuation and/or de-actuation of the valves 112, 122 may be brought about by operating the fail-safe-drive system 140 at different duty cycles.

With reference to FIG. 11, high-side and low-side supply conductors 164, 166 collectively couple the input power supply 162 to the high side drive circuit 850 and the fail-safe circuit 142. While other power regulation may be deployed, the input power supply 162 may also be embodied as a thermopile. In general, a thermopile may contain a series of thermoelements. Each thermoelement can be constructed from a thin wire made of two materials of different thermal activity. When a temperature difference occurs between the two ends of a wire, an electrical tension ("thermotension") develops. Connecting several thermoelements in series adds together the thermotension of each element, producing a useful electrical output signal.

Using a thermopile is particularly advantageous in systems that do not employ external power. In systems such as water heaters, the thermopile can be maintained in a pilot light or other flame so as to develop the input electrical signal. For example, the input electrical signal supplied by the thermopile can develop a voltage of about 0.4 to 0.8 volts. This voltage may be particularly useful for driving first and second solenoid coils 146, 156 designed for actuation at low voltages and currents.

In the alternative embodiment shown in FIG. 11, the energy-transfer device 150 of the fail-safe circuit 142 may be configured as shown with a first capacitor 1110 coupled in parallel with the first solenoid coil 146; a second switch 1112 for coupling the input electrical signal to the second solenoid coil 156, and a rectifier 1114, a second capacitor 1116, a resistor 1118 network for controlling the on and off states of the second switch 1112 and in turn current flow through the second solenoid coil 156. The architecture of these elements may be the same as any similar element noted above. For instance, the first and second capacitors 1110, 1116 may be polarized or non-polarized; the rectifier 1114 may be a diode; the second switch 1112 may be a transistor; etc. While not mentioned above, those skilled in the art will recognize resistor 1118 may be a carbon-based, silicon-based or any other type resistor.

While the second switch 1112 may take one of many forms, for convenience, the second switch 1112 in FIG. 11 is illustrated as a PNP bipolar transistor. The base of the transistor is coupled in series with the resistor 1118. Depending on the duty cycle, the energy-transfer device 150, through the rectifier 1114, second capacitor 1116, and resistor 1118 network, supplies a control signal to bias the base for the second transistor 1112. When the base is biased low, the second transistor 1112 turns on, causing the current $I_2$ to flow in the second solenoid coil 156. If current $I_2$ rises above the pull-in threshold, then the second valve 122 may actuate.

The operation of the fail-safe circuit 142 for the present embodiments at the high, mid-range and low duty cycles may be as follows. The operation is described in reference to FIG. 11, but as shown in the alternative embodiment of FIG. 12, a P-channel MOSFET may be used instead of a PNP transistor. As such, the fail-safe circuit 142 may include a second resistor 1220 that provides a discharge path for the second capacitor 1116, and a combination of rectifier 1222 and zener diode 1224 that provide voltage limiting for the second capacitor 1116.

(1) High Duty Cycle

When switch 144 is in the on state, the voltage between the first common node 172 and the common low-side-node 174 becomes approximately $V_{in}$. From this voltage, the current $I_1$ flows through the first solenoid coil 146 as the first capacitor 1110 charges. Given the long duration of the on-state of the switch 144, the first capacitor 1110 charges to $V_{in}$ and current $I_1$ flowing through the first solenoid coil 146 rises above the pull-in threshold causing the first valve 112 to actuate.

While the input electrical signal may be sufficient to supply current above the pull-in and hold-in thresholds, the first capacitor 1110 aids in actuating the first valve 112 and de-actuating the second valve 122 in the off state. The addition of the first capacitor 1110 increases the range of duty cycles at which only the first valve 112 actuates.

In the orientation shown, the rectifier 1114 is in a reverse biased orientation, and thus, it is not conducting. This in turn prevents the second capacitor 1116 from charging. With the second common node 176 at approximately zero potential, no current flows through the resistor 1118, which sends the second switch 1112 a control signal to turn off. Consequently, little or no current $I_2$ flows through the second solenoid coil 156. With little or no second current flowing through the second solenoid coil 156, the second valve 122 remains or operates in a de-actuated state.

When switch 144 is turned off for the remainder of the switching cycle, the charge on the first capacitor 1110 supplies the first current to first solenoid coil 146. In some instances, this charge may deplete or become slightly reversely charged by the freewheeling current $I_1$. Since there is little or no freewheeling through the second capacitor 1116 (the first capacitor 1110 provides the freewheeling path), the second capacitor 1116 stays uncharged and the second switch 1112 stays in off state. And, in turn, the second valve 122 stays unactuated.

The resistor 1118 may be used to regulate bias current of the second switch 1112. The resistor 1118 also provides additional fail-safe attributes. If for example, the second switch 1112 is shorted (e.g., the emitter, base, and collector are shorted together), the resistor 1118 may limit the current that can flow through the second switch 1112, the resistor 1118, the rectifier 1116, and the first solenoid coil 146. This makes de-actuating the first valve 112 possible by turning off the first switch 144.

(2) Low Duty Cycle

During the on state of the switch 144, the current $I_1$ builds in the first solenoid coil 146. But because the duration of the on state duration is short, the average of current $I_1$ fails to meet or exceed the pull-in threshold. The first capacitor 1110, however, charges to a voltage approximately equal to $V_{in}$. Given its reverse bias orientation, the rectifier 1116 does not conduct.

During the OFF state time, the current $I_1$ freewheels through rectifier 1114, and a negative potential develops in the second capacitor 1116. Thus, the second common node 176, i.e., the intersection of the rectifier 1114 and the resistor 1118 is at the same negative potential. This negative potential in combination with the input electrical signal provides a bias to the base of the second switch 1112 causing the input power supply 162 to supply the input electrical signal so as to cause the current $I_2$ to flow through the second solenoid coil 156. Since the long duration of the off state, the average of current $I_2$ builds to a value that meets or exceeds the pull-in current, actuating the second valve 122.

At beginning of the off state, the first capacitor 1110 supplies the current $I_1$ for a short portion of the off state as it discharges. After the first capacitor 1110 is discharged, the current $I_1$ freewheels through the second capacitor 1116 and the rectifier 1114. As it freewheels, the current $I_1$ charges the second capacitor 1116 to a negative potential. As noted, the first capacitor 1110 may have less storage capacity than the second capacitor 1116.

Consequently, a small portion of the freewheeling current $I_1$ flows through the first capacitor 1110, reversely charging it. The current $I_1$ decreases to zero before the on state starts and average of the current $I_1$ not sufficient to activate first valve 112. Although the current $I_1$ not sufficient to activate the first valve 112, it may still be greater than the base current necessary to bias the second switch 1112, maintaining the negative potential at the second common node 176. With the base biased on, the current $I_2$ meets or exceeds the pull-in and/or hold-in thresholds for the solenoid coil 156 causing the second valve 122 to be maintained in the actuated state.

(3) Mid-Range Duty Cycle

During the on state of the switch 144, the current $I_1$ flowing through the first solenoid coil 146 increases, and the first capacitor 1110 charges to a value approximately equal to the input voltage. At beginning of the off state, the first capacitor 1110 supplies current $I_1$ for a portion of the off state as it discharges. Once discharged, the current $I_1$ built up in the first solenoid coil 146 freewheels through the second capacitor 1116 and the rectifier 1114. This in turn charges the second capacitor 1116 to a negative potential.

As noted, the first capacitor 1110 may be have less storage capacity that the second capacitor 1114. Consequently, a small portion of the freewheeling current $I_1$ flows through the first capacitor 1110, reversely charging it. But unlike the low duty cycle, the current $I_1$ does not decrease to zero before the on state starts. The current $I_1$ (and the average thereof) is sufficient to actuate the first valve 112. The negative potential on the capacitor 1116 keeps the base of the second switch 1112 biased, which in turn causes the current $I_2$ to meet or exceed the pull-in and/or hold-in thresholds.

The second capacitor 1116 is charged by the current $I_1$ and discharged by the base current of the second switch 1112. The second capacitor 1116 can maintain the negative potential at the second common node 176 during both the on and off state of switch 144 even though the charging time is shorter than the discharging time. This may happen because the current $I_1$ is much higher than the base current of the second switch 1112.

(4) Very Low Duty Cycle

During the on state of the switch 144 at a very low duty cycle, e.g., a duty cycle less than about 10%, the current $I_1$ cannot rise above the pull-in threshold. During off state, any potential in the first capacitor 1110 cannot source enough current $I_1$ to actuate the first solenoid coil 146. A small amount of current $I_1$ may freewheel through 1110, and not the second capacitor 1116. Little or no negative potential is established at the second common node 176. Thus, during this duty cycle, both the first and second valves 112, 122 are de-actuated.

G. Conclusion

In view of the wide variety of embodiments to which the principles of the present invention can be applied, it should be understood that the illustrated embodiments are exemplary only, and should not be taken as limiting the scope of the present invention. For example, the steps of the operational modes may be taken in sequences other than those described, and more or fewer elements may be used in the block diagrams. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

It will be understood, however, that changes and modifications may be made to the invention without deviating from its true spirit and scope, as defined by the following claims.

I claim:

1. A fail-safe apparatus for controlling fluid flow through a series arrangement of first and second valves, wherein the fail-safe apparatus is operable at any of a plurality of switching cycles, wherein each of the plurality of switching cycles defines successive on and off states each having a given duration, wherein the duration of the successive on and off states defines one of a plurality of duty cycles, the fail-safe apparatus comprising:

a first solenoid coil for controlling operation of the first valve between an unactuated state and an actuated state;

a second solenoid coil for controlling operation of the second valve between an unactuated state and an actuated state;

a switch operable to couple during the on state of any of the plurality of duty cycles an input voltage across the first solenoid coil to cause a first current to flow therein; and an energy-transfer device coupling the first solenoid coil with the second solenoid coil, the energy-transfer device operable to store energy therein, wherein:

(i) during the on state of at least one of the plurality of duty cycles, a potential established in the energy-transfer device in combination with the input voltage causes a second current to flow in the second solenoid coil, (ii) during the off state of any of the plurality of duty cycles, the potential established in the energy-transfer device affects a decay rate of any first and second current flowing through their respective first and second solenoid coils, and (iii) when the first and second currents exceed respective first and second thresholds, the first and second solenoid coils cause their respective valves to operate in the actuated state.

2. The fail-safe apparatus recited in claim 1, wherein when the first valve is operating in the actuated state and an average of the first current is maintained above a third threshold over any of the plurality of switching cycles, the first valve is maintained in the actuated state.

3. The fail-safe apparatus recited in claim 2, wherein when the second valve is operating in the actuated state and an average of the second current is maintained above a fourth threshold over any of the plurality of switching cycles, the second valve is maintained in the actuated state.

4. The fail-safe apparatus recited in claim 1, wherein when the second valve is operating in the actuated state and an average of the second current is maintained above a fourth threshold over any of the plurality of switching cycles, the second valve is maintained in the actuated state.

5. The fail-safe apparatus recited in claim 1, wherein the plurality of duty cycles defines a high duty cycle having an on-state duration of approximately 70 to 100 percent of a given switching cycle, wherein during the on state, the switch couples the input voltage across the first solenoid coil so as to cause the first current to exceed the first threshold, thereby causing the first valve to operate in the actuated state; and wherein during the off state, the potential established in the energy transfer helps to maintain the first current so as to maintain the first valve in the actuated state.

6. The fail-safe apparatus recited in claim 5, wherein after the switch decouples the input voltage, the first current freewheels causing at least a portion of the energy stored in the energy-transfer device to deplete, and wherein after the switch couples the input voltage across the first solenoid coil, the input voltage replenishes the depleted portion of the energy stored in the energy-transfer device.

7. The fail-safe apparatus recited in claim 5, wherein the potential established in the energy-transfer device has a positive polarity from between the first solenoid coil to the second solenoid coil.

8. The fail-safe apparatus recited in claim 5, wherein during the on and off states, the potential established in the energy-transfer device limits the second current flow so as to cause the second current to be below the second threshold, thereby causing the second valve to operate in the unactuated state.

9. The fail-safe apparatus recited in claim 1, wherein the plurality of duty cycles defines a low duty cycle having an on state duration of approximately 10 to 30 percent of a given switching cycle, wherein during the on state:

(i) the switch couples the first voltage across the first solenoid coil so as to cause the first current to be below the first threshold, thereby causing the first valve to operate in the unactuated state, and (ii) the potential established in the energy-transfer device in combination with the input voltage causes the second current to exceed the second threshold, thereby causing the second valve to operate in the actuated state; and wherein during the off state:

(i) the potential established in the energy-transfer device affects the decay rate of the first current so as to maintain the first valve in the unactuated state, and (ii) the energy-transfer device provides freewheeling path for the second current so as to maintain the second valve in the actuated state.

10. The fail-safe apparatus recited in claim 9, wherein after the switch decouples the input voltage, the first current freewheels raising the potential established in the energy-transfer device, and wherein after the switch couples the input voltage across the first solenoid coil, the second current reduces the potential established in the energy-transfer device.

11. The fail-safe apparatus recited in claim 9, wherein the potential established in the energy-transfer device has a positive polarity from between the second solenoid coil to the first solenoid coil.

12. The fail-safe apparatus recited in claim 11, wherein the duration of the on state of the switch limits the first current flow so as to cause the first current to be below the second threshold, thereby causing the first valve to operate in the unactuated state.

13. The fail-safe apparatus recited in claim 1, wherein the plurality of duty cycles defines a mid-range duty cycle having an on state duration of approximately 50 percent of the given switching cycle, wherein substantially no net potential is established in the energy-transfer device, wherein during the on state:

(i) the switch couples the input voltage across the first solenoid coil to cause the first current to exceed the first threshold, thereby causing the first valve to operate in the actuated state, and (ii) any transient potential established in the energy-transfer device in combination with the input voltage causes the second current to exceed the second threshold, thereby causing the second valve to operate in the actuated state, and wherein during the off state, the energy-transfer device provides freewheeling paths for the first and second currents so as to maintain the first and second valve in the actuated state.

14. The fail-safe apparatus recited in claim 13, wherein after the switch decouples the input voltage, the energy-transfer device affects the decay rate of freewheeling first and second currents so as to maintain them above third and fourth thresholds, respectively.

15. The fail-safe apparatus recited in claim 1, wherein the energy-transfer device comprises a capacitor and rectifier network.

16. The fail-safe apparatus recited in claim 15, wherein the capacitor is device operable to store energy therein, wherein established: (i) during the on state of at least one of the plurality of duty cycles, a potential established in the capacitor in combination with the input voltage causes a second current to flow in the second solenoid coil, (ii) during the off state of any of the plurality of duty cycles, the potential established in the capacitor in combination with the rectifier affects the decay rate of any first current flowing through the first solenoid coil and the rectifier provides a freewheeling path for the second current flowing through the second solenoid coil.

17. The fail-safe apparatus recited in claim 15, wherein when the first valve is operating in the actuated state and an average of the first current is maintained above a third threshold over any of the plurality of switching cycles, the first valve is maintained in the actuated state.

18. The fail-safe apparatus recited in claim 16, wherein when the second valve is operating in the actuated state and an average of the second current is maintained above a fourth threshold over any of the plurality of switching cycles, the second valve is maintained in the actuated state.

19. The fail-safe apparatus recited in claim 15, wherein when the second valve is operating in the actuated state and an average of the second current is maintained above a fourth threshold over any of the plurality of switching cycles, the second valve is maintained in the actuated state.

20. The fail-safe apparatus recited in claim 15, wherein the plurality of duty cycles defines a high duty cycle having an on-state duration of approximately 70 to 100 percent of a given switching cycle, wherein during the on state, the switch couples the input voltage across the first solenoid coil so as to cause the first current to exceed the first threshold, thereby causing the first valve to operate in the actuated state; and wherein during the off state, the potential established in the capacitor helps to maintain the first current so as to maintain the first valve in the actuated state.

21. The fail-safe apparatus recited in claim 20, wherein after the switch decouples the input voltage, the first current freewheels causing at least a portion of the energy stored in the capacitor to deplete, and wherein after the switch couples the input voltage across the first solenoid coil, the input voltage replenishes the depleted portion of the energy stored in the capacitor.

22. The fail-safe apparatus recited in claim 20, wherein the first solenoid coil is coupled between a first-common node and a low-side reference node, wherein the capacitor is coupled between the first common node and a second common node; wherein the rectifier is coupled between the second common node and the low-side reference node in such a way to allow forward-bias current flow from the low-side reference node to the second common node; wherein the second solenoid coil is coupled between the second common node and the low-side reference node, and wherein the potential established in the energy-transfer device has a positive polarity from between first common node and a second common node.

23. The fail-safe apparatus recited in claim 20, wherein during the on and off states, the potential established in the capacitor limits the second current flow below the second threshold, thereby causing the second valve to operate in the unactuated state.

24. The fail-safe apparatus recited in claim 15, wherein the plurality of duty cycles defines a low duty cycle having an on state duration of approximately 10 to 30 percent of a given switching cycle, wherein during the on state:

(i) the switch couples the first voltage across the first solenoid coil so as to cause the first current to be below the first threshold, thereby causing the first valve to operate in the unactuated state, and (ii) the potential established in the capacitor in combination with the input voltage causes the second current to exceed the second threshold, thereby causing the second valve to operate in the actuated state; and wherein during the off state:

(i) the potential established in the capacitor affects the decay rate of the first current so as to maintain the first valve in the unactuated state, and (ii) the rectifier provides a freewheeling path for the second current so as to maintain the second valve in the actuated state.

25. The fail-safe apparatus recited in claim 24, wherein after the switch decouples the input voltage, the first current freewheels through the rectifier raising the potential established in the capacitor, and wherein after the switch couples the input voltage across the first solenoid coil, the input voltage causes the second current flowing through the capacitor and thus reduces the potential established in the capacitor.

26. The fail-safe apparatus recited in claim 24, wherein the first solenoid coil is coupled between a first-common node and a low-side reference node, wherein the capacitor is coupled between the first common node and a second common node; wherein the rectifier is coupled between the second common node and the low-side reference node in such a way to allow forward-bias current flow from the low-side reference node to the second common node; wherein the second solenoid coil is coupled between the second common node and the low-side reference node, and wherein the potential established in the capacitor has a positive polarity from between the second common node to the first common node.

27. The fail-safe apparatus recited in claim 24, wherein the duration of the on state of the switch limits the first current flow so as to cause the first current to be below the second threshold, thereby causing the first valve to operate in the unactuated state.

28. The fail-safe apparatus recited in claim 15, wherein the plurality of duty cycles defines a mid-range duty cycle having an on state duration of approximately 50 percent of the given switching cycle, wherein substantially no net potential is established in the capacitor, wherein during the on state:
  (i) the switch couples the input voltage across the first solenoid coil to cause the first current to exceed the first threshold, thereby causing the first valve to operate in the actuated state, and
  (ii) any transient potential established in the capacitor in combination with the input voltage causes the second current to exceed the second threshold, thereby causing the second valve to operate in the actuated state; and wherein during the off state the substantially no net potential established in the capacitor in combination with the rectifier controls the decay of the first and second currents so as to maintain the first and second valve in the actuated state.

29. The fail-safe apparatus recited in claim 28, wherein after the switch decouples the input voltage, the capacitor in combination with the rectifier affects the decay rate of freewheeling first and second currents so as to maintain them above third and fourth thresholds, respectively.

30. The fail-safe apparatus recited in claim 15, further comprising passive-current-limiting circuitry for limiting first current flow through the first solenoid coil when operating at a duty cycle from about 0.7 to 1, and for limiting the second current flow through the second solenoid coil when operating at a duty cycle from about 0.1 to 0.3.

31. The fail-safe apparatus recited in claim 30, wherein the first solenoid coil is coupled between a first-common node and a low-side reference node, wherein the capacitor is coupled between the first common node and a second common node; wherein the rectifier is coupled between the second common node and the low-side reference node in such a way to allow forward-bias current flow from the low-side reference node to the second common node; wherein the second solenoid coil is coupled between the second common node and the low-side reference node, and wherein the passive-current-limiting circuitry comprises:
  first and second resistors in a series arrangement coupled between the switch and the first common node; and
  a second capacitor coupled in parallel across the first resistor.

32. The fail-safe apparatus recited in claim 31, wherein the combination of the first and second resistors limit currents flow through the first and second solenoid coils when operating at the duty cycle of about 0.7 to 1, and wherein the second resistor limits currents flow through the first and second solenoid coils when operating at the duty cycle of about 0.1 to 0.3, while the second capacitor bypasses the first resistor.

33. The fail-safe apparatus recited in claim 1, wherein the switch comprises a transistor, and wherein the duty cycle of the switch is controlled by a control signal.

34. The fail-safe apparatus recited in claim 33, wherein the control signal is supplied by a microprocessor.

35. The fail-safe apparatus recited in claim 33, wherein the control signal comprises a pulse-width-modulated signal.

36. The fail-safe apparatus recited in claim 33, wherein the control signal comprises a pulse-frequency-modulated signal.

37. The fail-safe apparatus recited in claim 33, wherein the transistor comprises a metal-oxide-field-effect transistor (MOSFET) having a gate, source and drain, and further comprising an alternating-current-coupling circuit coupled to the gate and source of the MOSFET.

38. The fail-safe apparatus recited in claim 37, further comprising passive-current-limiting circuitry coupled between the MOSFET and the first solenoid coil or between the power supply and the MOSFET.

39. The fail-safe apparatus recited in claim 37, wherein the first solenoid coil is coupled between a first-common node and a low-side reference node, wherein the energy-transfer device is coupled between the first solenoid coil and the second solenoid coil; wherein the second solenoid coil is coupled between a second common node and the low-side reference node, wherein when the MOSFET is a P-channel enhancement type having its drain coupled to the first common node, the alternating-current-coupling circuit comprises:
  a rectifier coupled between the gate and source of the MOSFET, wherein the rectifier allows a forward-bias-current flow from the gate to the source;
  a first resistor coupled between the gate and source of the MOSFET; and
  a capacitor having a first end coupled to the gate of the MOSFET and a second end for receiving the control signal.

40. The fail-safe apparatus recited in claim 39, further comprising:
  second and third resistors in a series arrangement coupled between the drain of the MOSFET and the first common node; and
  a second capacitor coupled in parallel across the first resistor.

41. The fail-safe apparatus recited in claim 37, wherein the first solenoid coil is coupled between a first-common node and a third-common node, wherein the energy-transfer device is coupled between the first solenoid coil and the second solenoid coil; wherein the second solenoid coil is coupled between a second common node and the third-common node, and wherein when the MOSFET is a N-channel enhancement type having its source coupled to the low-side reference node, the alternating-current-coupling circuit comprises:
  a rectifier coupled between the gate and source of the MOSFET, wherein the rectifier allows a forward bias current flow from the source to the gate;

a first resistor coupled between the gate and source of the MOSFET; and a capacitor having a first end coupled to the gate of the MOSFET and a second end for receiving the control signal.

42. The fail-safe apparatus recited in claim 41, further comprising:

second and third resistors in a series arrangement coupled between the power supply and the first common node; and a second capacitor coupled in parallel across the first resistor.

43. The fail-safe apparatus recited in claim 1, further including a direct-current to direct-current (DC-DC) converter operable at a plurality of duty ratios, wherein the DC-DC converter has an output to supply the input voltage.

44. The fail-safe apparatus recited in claim 43, wherein the DC-DC converter comprises a regulator in a standard buck-style configuration.

45. The fail-safe apparatus recited in claim 43, wherein the DC-DC converter comprises a regulator in a standard boost-style configuration.

46. The fail-safe apparatus recited in claim 43, wherein the duty ratio of the DC-DC converter is controlled by pulse-width-modulation.

47. The fail-safe apparatus recited in claim 43, wherein the duty ratio of the DC-DC converter is controlled by pulse-frequency-modulation.

48. The fail-safe apparatus recited in claim 1, wherein the energy-transfer device comprises a first capacitor, a second capacitor, a rectifier, a second switch, and a resistor to limit control current to the second switch.

49. The fail-safe apparatus recited in claim 48, wherein the second capacitor is a device operable to store energy therein, wherein (i) during the on state and off state of at least one of the plurality of duty cycles, the potential established in the second capacitor in combination with the input voltage biases the second switch to cause a second current to flow in the second solenoid coil, and (ii) during the off state of any of the plurality of duty cycles, the potential established in the first capacitors in combination with the rectifier affects the decay rate of any first current flowing through the first solenoid coil.

50. The fail-safe apparatus recited in claim 48, wherein when the first valve is operating in the actuated state and an average of the first current is maintained above a third threshold over any of the plurality of switching cycles, the first valve is maintained in the actuated state.

51. The fail-safe apparatus recited in claim 50, wherein when the second valve is operating in the actuated state and an average of the second current is maintained above a fourth threshold over any of the plurality of switching cycles, the second valve is maintained in the actuated state.

52. The fail-safe apparatus recited in claim 48, wherein when the second valve is operating in the actuated state and an average of the second current is maintained above a fourth threshold over any of the plurality of switching cycles, the second valve is maintained in the actuated state.

53. The fail-safe apparatus recited in claim 48, wherein the plurality of duty cycles defines a high duty cycle having an on-state duration of approximately 70 to 100 percent of a given switching cycle, wherein during the on state the switch couples the input voltage across the first solenoid coil so as to cause the first current to exceed the first threshold, thereby causing the first valve to operate in the actuated state, and wherein during the off state, the potential established in the first capacitor affects the decay rate of the first current so as to maintain the first valve in the actuated state.

54. The fail-safe apparatus recited in claim 53, wherein after the switch decouples the input voltage, the first current freewheels causing at least a portion of the energy stored in the first capacitor to deplete, and wherein after the switch couples the input voltage across the first solenoid coil, the input voltage replenishes the depleted energy of the potential stored in the first capacitor.

55. The fail-safe apparatus recited in claim 53, wherein the first solenoid coil is coupled between a first-common node and a low-side reference node, wherein the first capacitor is coupled between the first common node and the low-side reference, wherein the rectifier is coupled between the first common node and a second common node in such a way to allow forward-bias current flow from the second common node to the first common node, wherein the second capacitor is coupled between the second common node and the low-side reference node, wherein the second switch is coupled between the second common node and the first switch, wherein the second solenoid coil is coupled between a second side of the second switch and the low-side reference node, and wherein the potential established in the second capacitor has a negative polarity from between second common node and the low-side reference node.

56. The fail-safe apparatus recited in claim 53, wherein during the on and off states the potential established in the second capacitor is insufficient to activate the second switch, thereby causing the second valve to operate in the unactuated state.

57. The fail-safe apparatus recited in claim 48, wherein the plurality of duty cycles defines a low duty cycle having an on state duration of approximately 10 to 30 percent of a given switching cycle, wherein during the on state:

(i) the switch couples the first voltage across the first solenoid coil so as to cause the first current to be below the first threshold, thereby causing the first valve to operate in the unactuated state, and (ii) the potential established in the second capacitor in combination with the input voltage biases the second switch to cause the second current to exceed the second threshold, thereby causing the second valve to operate in the actuated state; and wherein during the off state:

(i) the potential established in the first capacitor affects the decay rate of the first current so as to maintain the first valve in the unactuated state, and (ii) a freewheeling first current increases the potential established in the second capacitor, this potential in combination with the input voltage biases the second switch so as to cause the second current to exceed the second threshold, thereby causing the second valve to operate in the actuated state.

58. The fail-safe apparatus recited in claim 57, wherein after the switch decouples the input voltage, the first current freewheels through the second capacitor and rectifier raising the potential established in the second capacitor.

59. The fail-safe apparatus recited in claim 57, wherein the first solenoid coil is coupled between a first-common node and a low-side reference node, wherein the first capacitor is coupled between the first common node and the low-side reference, wherein the rectifier is coupled between the first common node and a second common node in such a way to allow forward-bias current flow from the second common node to the first common node, wherein the second capacitor is coupled between the second common node and the low-side reference node, wherein the second switch is coupled between the second common node and the first switch, wherein the second solenoid coil is coupled between a second side of the second switch and the low-side reference node, and wherein the potential established in the second capacitor has a negative polarity from between second common node and the low-side reference node.

60. The fail-safe apparatus recited in claim 57, wherein the duration of the on state of the switch limits the first current flow so as to cause the first current to be below the second threshold, thereby causing the first valve to operate in the unactuated state.

61. The fail-safe apparatus recited in claim 48, wherein the plurality of duty cycles defines a mid-range duty cycle having an on state duration of approximately 50 percent of the given switching cycle, wherein a negative potential is established in the second capacitor, wherein during the on state:
  (i) the switch couples the input voltage across the first solenoid coil to cause the first current to exceed the first threshold, thereby causing the first valve to operate in the actuated state, and
  (ii) the potential established in the second capacitor in combination with the input voltage biases the second switch to cause the second current to exceed the second threshold, thereby causing the second valve to operate in the actuated state; and wherein during the off state:
  (i) the potential established in the first capacitor affects the decay rate of the first current so as to maintain the first valve in the actuated state, and
  (ii) the freewheeling first current increases the potential established in the second capacitor which in combination with the input voltage biases the second switch to cause the second current to exceed the second threshold, thereby causing the second valve to operate in the actuated state.

62. The fail-safe apparatus recited in claim 61, wherein after the switch decouples the input voltage, the first capacitor and the second capacitor in combination with the rectifier affects the decay of freewheeling first current so as to maintain the first current above third threshold, wherein the freewheeling first current increases the potential in second capacitor, this potential in combination with the input voltage biases the second switch to cause the second current above the fourth threshold.

63. In a fail-safe system for controlling fluid flow through a series arrangement of first and second valves, wherein the fail-safe system is operable at any of a plurality of switching cycles, wherein each of the plurality of switching cycles defines successive on and off states each having a given duration, wherein the duration of the successive on and off states defines one of a plurality of duty cycles, a method for operating the fail-safe system comprising:
  (a) applying an input voltage across a first solenoid coil during the on state of any of the plurality of duty cycles so as to cause a first current to flow therein;
  (b) during the on state of at least one of the plurality of duty cycles, applying a combination of (i) a potential established in an energy-transfer device and (ii) the input voltage as to cause a second current to flow in a second solenoid coil, wherein the energy-transfer device couples the first solenoid coil with the second solenoid coil;
  (c) removing the input voltage from across first solenoid coil during the off state of any of the plurality of duty cycles so as allow the first and second currents to decay; and
  (d) using the potential established in the energy-transfer device to affect a decay rate of any first and second current flowing through their respective first and second solenoid coils during the off state of any of the plurality of duty cycles, wherein when the first and second currents exceed respective first and second thresholds, the first and second solenoid coils cause their respective valves to operate in actuated states.

64. The method of claim 63, further comprising:
  maintaining an average of the first current above a third threshold over any of the plurality of switching cycles to maintain the first valve in the actuated state; and
  maintaining an average of the second current above a fourth threshold over any of the plurality of switching cycles to maintain the second valve in the actuated state.

65. The method of claim 64, wherein the plurality of duty cycles defines a high duty cycle having an on-state duration of approximately 70 to 100 percent of a given switching cycle, wherein at the high duty cycle step (a) causes the first current to exceed the first threshold, and step (d) helps to maintain the first current over the third threshold.

66. The method of claim 64, wherein the plurality of duty cycles defines a low duty cycle having an on state duration of approximately 10 to 30 percent of a given switching cycle, wherein at the low duty cycle step (a) causes the first current to be below the first threshold, step (b) causes the second current to exceed the second threshold, and step (d) affects the decay rate of the first current so as to maintain the first valve in the unactuated state, and further comprising using the energy-transfer device as a freewheeling path for the second current to maintain the second valve in the actuated state.

67. The method of claim 64, wherein the plurality of duty cycles defines a mid-range duty cycle having an on state duration of approximately 50 percent of the given switching cycle, wherein substantially no net potential is established in the energy-transfer device, and wherein at the mid-range duty cycle, step (a) causes the first current to exceed the first threshold, and step (b) causes the second current to exceed the second threshold, and further comprising using the energy-transfer device as a freewheeling paths for the first and second currents to maintain the first and second valves in the actuated state.

68. The method of claim 67, wherein step (c) affects the decay rate of the freewheeling first and second currents so as to maintain them above third and fourth thresholds, respectively.

* * * * *